United States Patent
Ohno et al.

(10) Patent No.: US 7,620,910 B2
(45) Date of Patent: Nov. 17, 2009

(54) IMAGE DISPLAY METHOD AND PROGRAM WITH USAGE OF NUMERIC KEYS AND CURSOR KEYS

(75) Inventors: Tomoyuki Ohno, Kanagawa (JP);
Shuntaro Aratani, Tokyo (JP);
Katsuhiro Miyamoto, Kanagawa (JP);
Tomoyasu Yoshikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/052,113

(22) Filed: Mar. 20, 2008

(65) Prior Publication Data

US 2008/0178217 A1     Jul. 24, 2008

Related U.S. Application Data

(62) Division of application No. 10/864,448, filed on Jun. 10, 2004.

(30) Foreign Application Priority Data

Jun. 20, 2003   (JP)   ............................. 2003-176857

(51) Int. Cl.
  *G06F 3/048* (2006.01)
(52) U.S. Cl. .................... 715/790; 715/823; 715/826; 345/656; 345/655
(58) Field of Classification Search ................ 715/838, 715/790, 823, 826; 345/656, 655
See application file for complete search history.

(56) References Cited

U.S. PATENT DOCUMENTS

| | | | |
|---|---|---|---|
| 5,682,207 A | 10/1997 | Takeda et al. | 348/568 |
| 6,160,553 A | 12/2000 | Robertson et al. | 345/339 |
| 6,684,087 B1 * | 1/2004 | Yu et al. | 455/566 |
| 7,142,777 B1 | 11/2006 | Ohno | 386/95 |
| 7,197,231 B2 | 3/2007 | Hoshi et al. | 386/83 |
| 2002/0019982 A1 | 2/2002 | Aratani et al. | 725/59 |
| 2002/0033848 A1 | 3/2002 | Sciammarella et al. | 345/838 |

(Continued)

FOREIGN PATENT DOCUMENTS

CN         1273499 A         11/2000

(Continued)

OTHER PUBLICATIONS

Japanese Official Action in Japanese Patent Appln. No. 2003-176857 (with translation).

*Primary Examiner*—Steven P Sax
*Assistant Examiner*—Andrey Belousov
(74) *Attorney, Agent, or Firm*—Fitzpatrick, Cella, Harper & Scinto

(57) ABSTRACT

To improve ease of operation with which a user selects an image when many images are simultaneously displayed on a screen, a frame, which divides many images into 12 areas, is superimposed and displayed on a screen displaying thumbnail exhibition thereon. For example, the press of a channel key allows selecting one of the areas and moving to the selected area a focus frame indicating a candidate image for selection, and then the presses of cursor keys allow moving the focus frame to a desired image to be selected. The number of areas can be changed and displayed according to the number of channel keys when a television remote control is used, or according to the number of numeric keys when a mobile telephone is used.

2 Claims, 28 Drawing Sheets

U.S. PATENT DOCUMENTS

| | | | |
|---|---|---|---|
| 2002/0063797 A1 | 5/2002 | Aratani et al. | 348/553 |
| 2002/0067380 A1 | 6/2002 | Graham | 345/838 |
| 2002/0089610 A1 | 7/2002 | Ohno et al. | 348/734 |
| 2003/0142236 A1 | 7/2003 | Aratani et al. | 348/554 |
| 2003/0208778 A1 | 11/2003 | Aratani et al. | 725/139 |
| 2004/0117830 A1 | 6/2004 | Ohno et al. | 725/51 |
| 2004/0261136 A1 | 12/2004 | Aratani et al. | 725/151 |
| 2004/0263664 A1 | 12/2004 | Aratani et al. | 348/333.12 |

FOREIGN PATENT DOCUMENTS

| | | |
|---|---|---|
| EP | 0 926 878 A2 | 6/1999 |
| JP | 09-266560 | 10/1997 |
| JP | 2001-306375 | 11/2001 |
| JP | 2002-014773 | 1/2002 |
| JP | 2002-149323 | 5/2002 |
| KR | 10-031570 B1 | 2/2002 |

* cited by examiner

IMAGE DISPLAY METHOD AND PROGRAM WITH USAGE OF NUMERIC KEYS AND CURSOR KEYS

This application is a division of application Ser. No. 10/864,448 filed Jun. 10, 2004.

BACKGROUND OF THE INVENTION

1. Field of the Invention

The present invention relates to an image display method and a program, and more particularly to an image display method and a program which are suitable for application to an image display device having the functions of reproducing or displaying images picked up by a digital still camera, a digital video camera, or the like, an image display method possessed by a digital television, and an application software program which permits an image display device or the like to execute an image display method.

2. Description of the Related Art

A larger number of images can be picked up by one memory card against a backdrop of a larger capacity of a storage medium, in particular a memory card, for use in a digital still camera (hereinafter referred to simply as a "DSC") or a digital video camera (hereinafter referred to simply as a "DVC"). Moreover, picking up many images leads to increasing user needs for thumbnail image exhibition which permits displaying more images on one screen and selecting a desired image to be viewed from among the displayed images. Furthermore, the widespread use of digital television broadcasts yields further digitization of a television set (hereinafter referred to simply as a "television" or a "TV"), and thus results in the emergence of products which do not use a personal computer (hereinafter referred to simply as a "PC") to view images but can use a television to view images picked up by a DSC or a DVC.

The related art will be described below with reference to the drawings. FIG. 2 shows an example of thumbnail exhibition for many images, and FIG. 3 shows a television remote control.

Referring to FIG. 2, numeral 201 denotes a full television display screen, numeral 202 denotes a focus frame indicating a candidate image for selection, numeral 203 denotes a candidate image display which displays on a sub-screen an image currently focused by the focus frame 202 and its file name, and numeral 204 denotes a thumbnail image on thumbnail exhibition, which is diagonally opposite to the image currently focused by the focus frame 202.

Referring to FIG. 3, numeral 301 denotes a set of four cursor keys which permit four-directional movements, that is, up, down, right, and left movements, of the focus frame indicated by numeral 202 in FIG. 2, numeral 302 denotes an Enter key which is used to display a focused image on the full television display screen 201 shown in FIG. 2, and numeral 303 denotes a set of channel keys, each of which is used to select a television channel.

Because of a larger display screen of a plasma display, a liquid crystal display, or the like, a television using such a display does not have the occurrence of display of too small thumbnails, even when the television gives thumbnail exhibition containing a total of 48 thumbnails, that is, 8 thumbnails wide by 6 thumbnails long, as shown in FIG. 2. This makes it possible to display many images on one screen. A user can operate the television in the following manner: the user uses the cursor keys 301 of the remote control shown in FIG. 3 to move the focus frame 202 and select a desired candidate image to be displayed; and then the user presses the Enter key 302 to display the selected image on the full television display screen 201.

Display methods for displaying many images include, for example, a method disclosed in Japanese Patent Application Laid-Open (JP-A) No. 2001-306375, which involves displaying many images overlapping one another, and changing the positions of the images so that the images have varying exposed portions.

SUMMARY OF THE INVENTION

However, a problem exists as given below. When a television gives thumbnail exhibition as shown in FIG. 2, a user has difficulty in operating a remote control for full-screen display. More specifically, when an orderly arrangement of a few tens of images, for example, 20 images or more, is simultaneously displayed on one screen, the operation for selecting one image from among the displayed images does not progress smoothly. Thus, the thumbnail exhibition shown in FIG. 2 has the problem of impairing ease of use.

It is therefore an object of the present invention to provide an image display method which improves ease of operation with which a user selects an image when many images such as various thumbnail exhibitions are simultaneously displayed on a screen.

To achieve the above object, the present invention provides an image display method including the steps of: selecting an image from among a plurality of images simultaneously displayed on an image display screen; and superimposing and displaying an auxiliary image on the screen on which the plurality of images are simultaneously displayed for selecting the range of candidate images from the plurality of images displayed on the screen.

According to the present invention, an auxiliary image facilitates selecting candidate images from among many images and narrowing down the candidate images. Therefore, the image display method of the present invention can improve ease of operation with which a user selects an image.

Desirably, the range of candidate images for selection is selected through a unit operation of operating means, and one image is selected from the selected range of candidate images through another operation. Alternatively, the range of candidate images for selection may be selected through operation of a first key of the operating means for selecting the image, and one image may be selected from the selected range through operation of a second key. Referring to, for example, FIG. 2, a user must perform a total of at least 13 operations of a remote control, such as at least 12 presses of cursor keys and one press of an Enter key, in order that the user may use cursor keys 301 shown in FIG. 3 to move a focus frame from the position of an image focused by a current focus frame 202 to the position of an image indicated by numeral 204 and to display the image 204 on a full television display screen 201. The image display method of the present invention can eliminate the need for at least 13 operations of the remote control, and thus solve the problem of impairing ease of operation.

The auxiliary image sets a plurality of areas, each of which contains candidate images for selection, on the screen on which the plurality of images is simultaneously displayed. Desirably, the method further includes the step of changing and displaying the number of areas according to the number of area selecting means, each of which corresponds to each of the areas and selects the corresponding area.

The area selecting means may comprise means for selecting a television channel, such as a remote control having keys such as push buttons, a rotary dial, or a stick, or may comprise means for operating a telephone, such as a mobile telephone having the same or similar keys.

The present invention also provides an image display method for displaying an image on a screen, which includes the steps of: selecting an image from among a plurality of images simultaneously displayed on the screen; rotating at least one of the plural images by a predetermined angle θ (0°<θ<360°) with respect to a reference direction in the screen, and displaying the rotated image; and displaying the selected image so that the image is oriented in the reference direction, when the image displayed as rotated by the angle θ is selected.

According to the present invention, a plurality of images is arranged at different angles, whereas a selected image is oriented in the reference direction. This facilitates visual recognition of images and thus permits an improvement in ease of operation.

Preferably, three or more images are rotated by the predetermined angle θ and are displayed in their rotated positions, and the angles θ of rotation of the images are different from one another.

Images of the plural images belonging to a first group may be spaced at predetermined intervals and arranged in a two-dimensional matrix, images belonging to a second group may be spaced at predetermined intervals and arranged in a two-dimensional matrix, and the respective images of the first and second groups may be spaced and arranged at intervals, each of which is shorter than the predetermined interval.

The above-described image display method can be provided via a medium such as a storage medium or the Internet, in the form of a software program which permits a controller of an image display device such as a television set to execute the image display method.

DESCRIPTION OF THE DRAWINGS

The invention, together with further advantages thereof, may best be understood by reference to the following description taken in conjunction with the accompanying drawings in which:

FIG. 1 is a block diagram showing the configuration of an image display device according to first, second, third, fourth, fifth and seventh embodiments, which the present invention is to be applied to;

FIG. 22 is a block diagram showing the configuration of an image display device according to a sixth embodiment, which the present invention is to be applied to;

DESCRIPTION OF THE INVENTION

First Embodiment

A first embodiment of the present invention will be described below with reference to the drawings.

Figure 1:
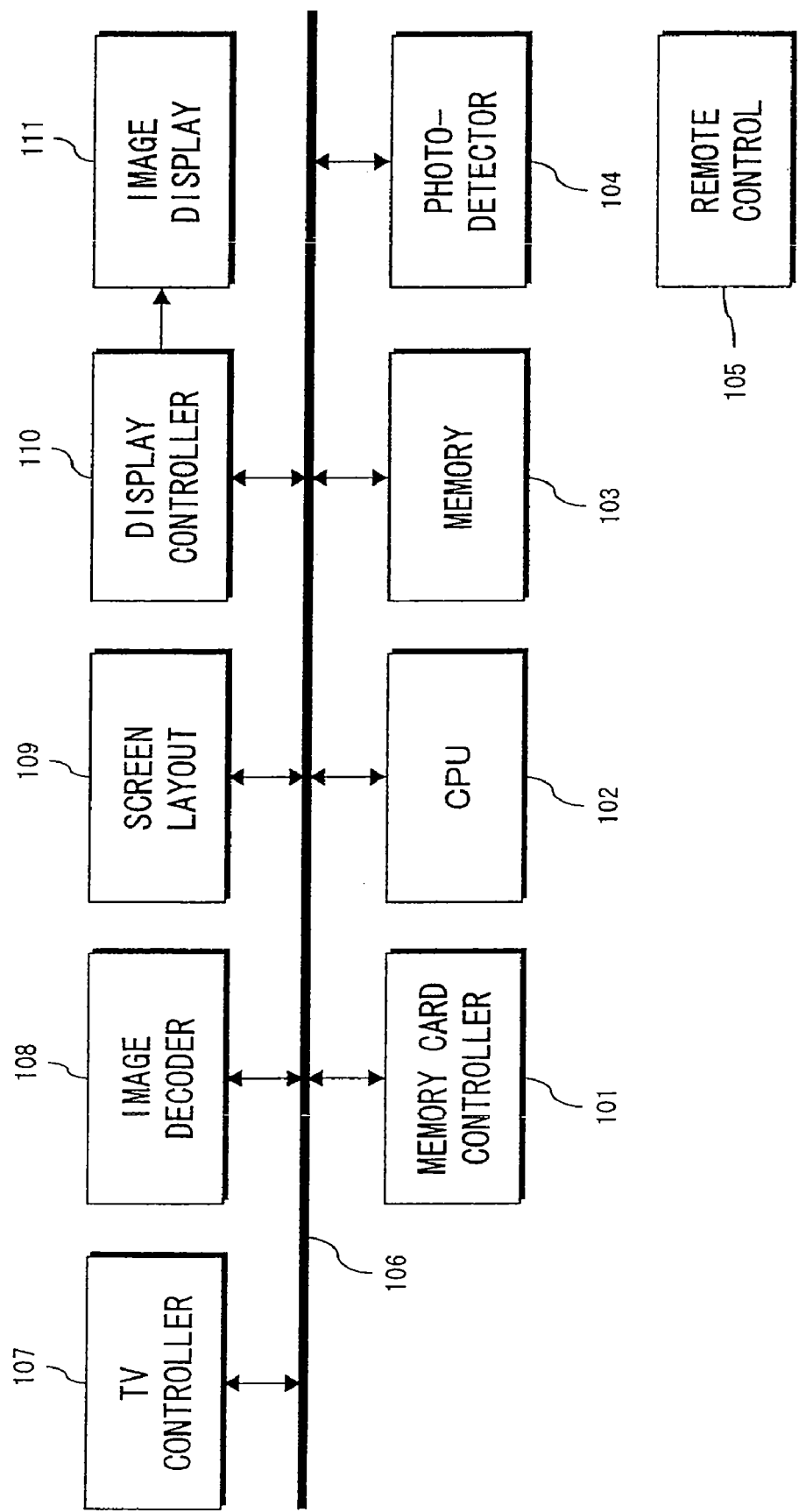

FIG. 1 shows the configuration of an image display device according to the first embodiment, which the present invention is to be applied to. As shown in FIG. 1, numeral 101 denotes a memory card controller, and numeral 102 denotes a CPU (central processing unit) which executes an image display method according to the present invention, which is provided in the form of software. Numeral 103 denotes a memory, numeral 104 denotes a photo-detector, numeral 105 denotes a remote control, numeral 106 denotes a control bus, numeral 107 denotes a TV controller, numeral 108 denotes an image decoder, numeral 109 denotes a screen layout, numeral 110 denotes a display controller, and numeral 111 denotes an image display. The TV controller 107 has facilities for receiving a TV broadcasting signal through an antenna (not shown) and displaying a TV program on the image display 111.

Figure 2:
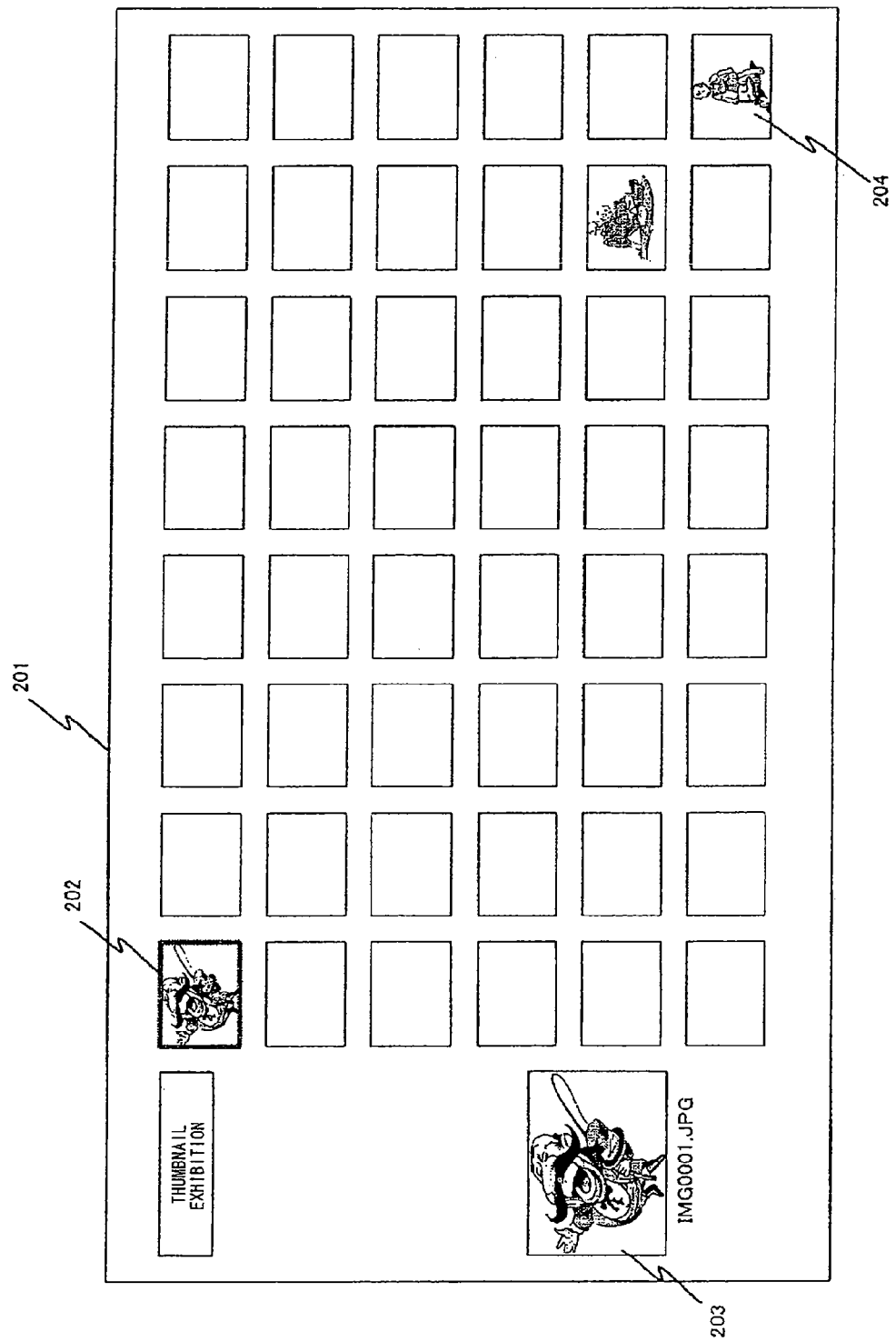
FIG. 2 is an illustration of an example of thumbnail exhibition for many images according to the related art and the first embodiment of the present invention.
Figure 4:
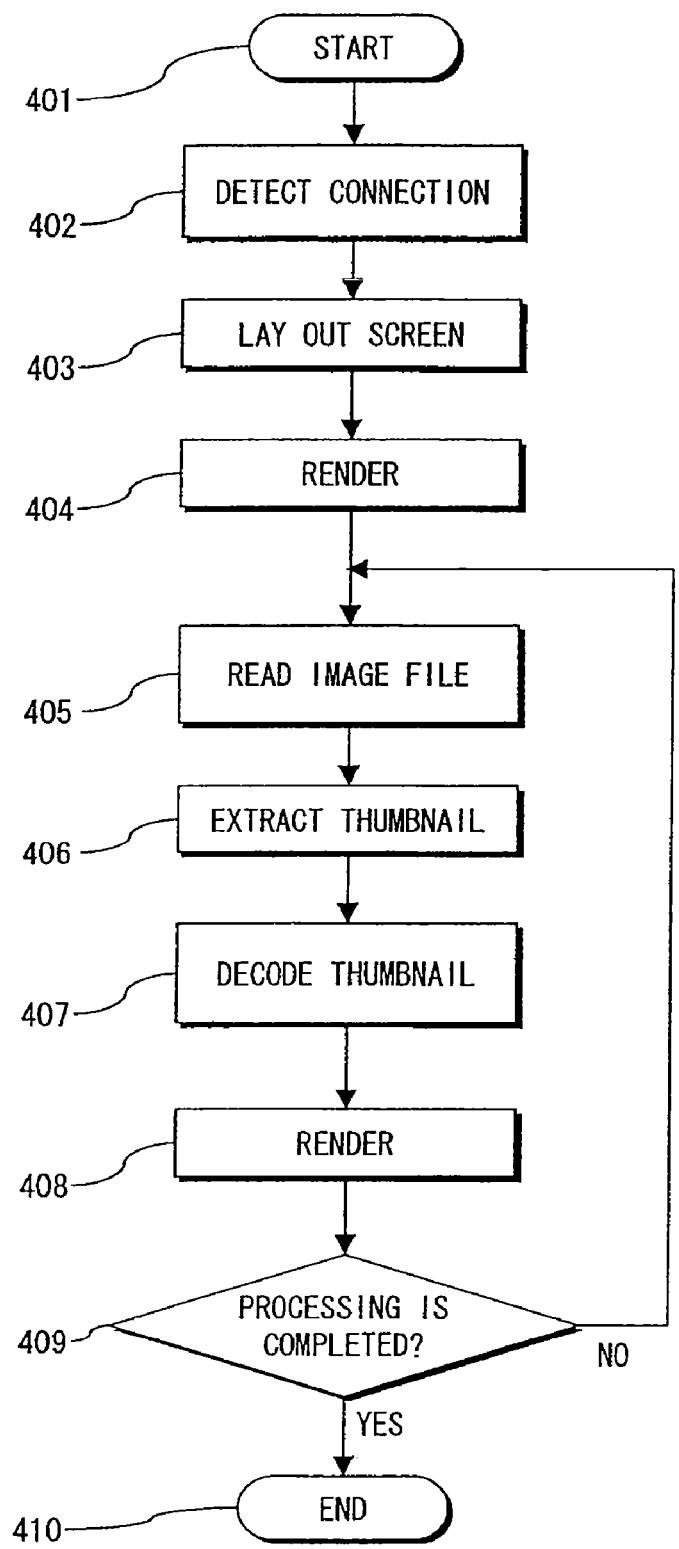
FIG. 4 is a flowchart of operation according to the first embodiment of the present invention.

FIG. 4 shows a flowchart of operation, which takes place between the connection of a memory card (not shown) to the memory card controller 101 shown in FIG. 1 and the display of thumbnail exhibition shown in FIG. 2 on the image display 111.

In step 401 of FIG. 4, a user first connects the memory card to the memory card controller 101 shown in FIG. 1. In this case, the memory card has many independent images stored therein, and the images are, for example, pictures taken by a DSC, a DVC, or the like.

In step 402 of FIG. 4, when the memory card controller 101 shown in FIG. 1 detects the connection of the memory card, the memory card controller 101 transmits to the CPU 102 information indicating the detection of connection.

In step 403 of FIG. 4, under control of the CPU 102 shown in FIG. 1, display data required for thumbnail image exhibition (except for thumbnail image data), such as background data to be displayed on a full display screen 201 shown in FIG. 2, is transferred via the control bus 106 to the screen layout 109, which then lays out a screen using the display data.

In step 404 of FIG. 4, under control of the CPU 102, the display data is transferred to the display controller 110 shown in FIG. 1, which then causes the image display 111 to render and display the display data on the screen.

In step 405 of FIG. 4, under control of the CPU 102 shown in FIG. 1, one of image files stored in the memory card is read into the memory 103 via the control bus 106 and the memory card controller 101.

In step 406 of FIG. 4, under control of the CPU 102 shown in FIG. 1, thumbnail image information is extracted from the image file read into the memory 103.

In step 407 of FIG. 4, under control of the CPU 102 shown in FIG. 1, the extracted thumbnail image information is supplied to the image decoder 108, which then decodes the thumbnail image.

In step 408 of FIG. 4, the thumbnail image data decoded in the preceding step is supplied to the display controller 110 shown in FIG. 1, which then causes the image display 111 to render and display the thumbnail image data on the screen.

Figure 5:
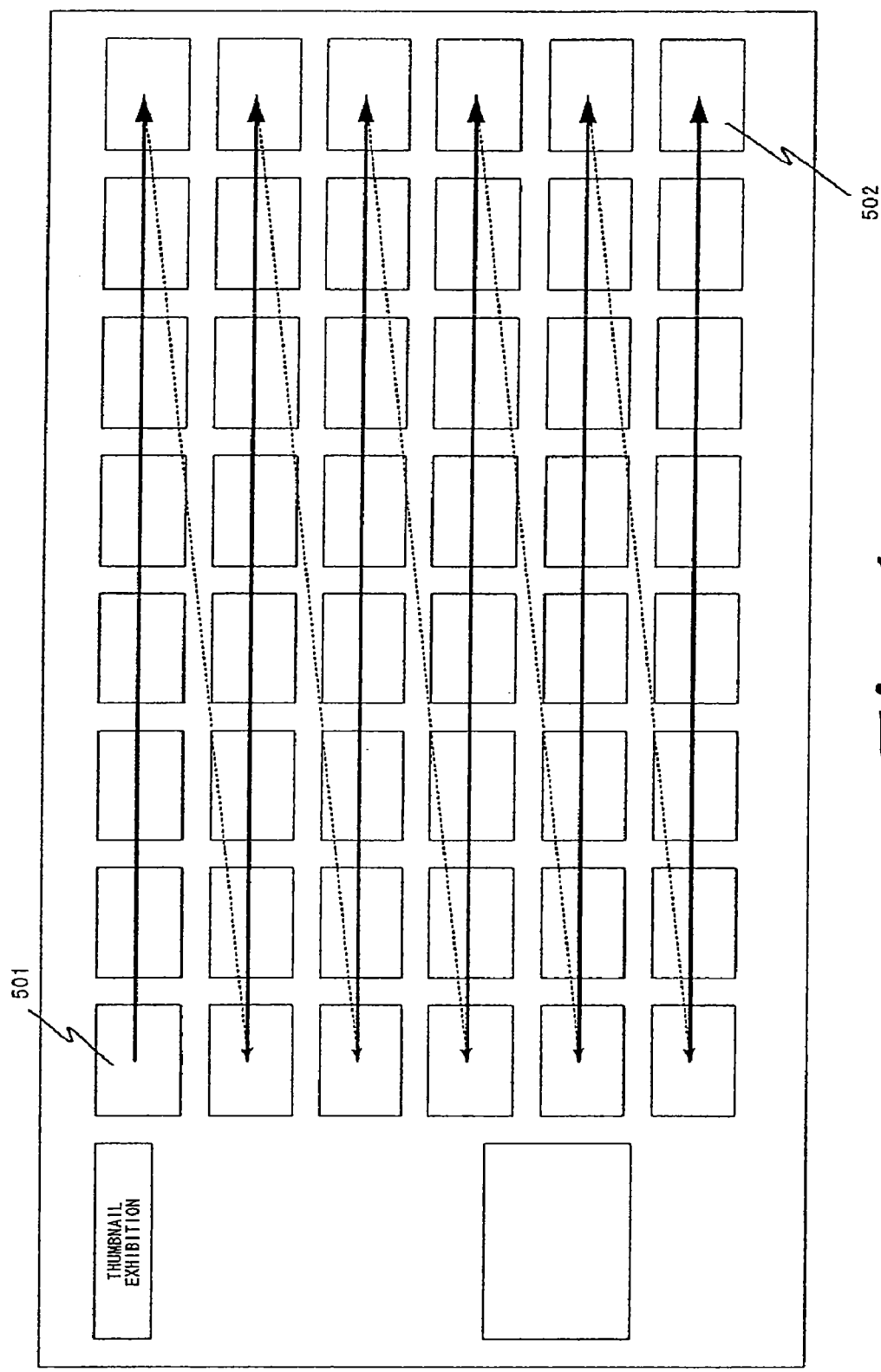
FIG. 5 is a conceptual illustration of the order of rendering according to the first embodiment of the present invention.

The above-mentioned steps 405 to 408 of FIG. 4 are repeatedly executed times equivalent to the number of images that can be simultaneously displayed on one screen. Thus, rendering takes place as shown by the arrows of FIG. 5, starting with the upper left corner and ending with the lower right corner. More specifically, images are rendered in sequence so that an image is first rendered at the position indicated by numeral 501 and an image is finally rendered at the position indicated by numeral 502. At the completion of thumbnail exhibition of a predetermined number of images, the processing goes to step 410, where the processing ends. In the first embodiment, the predetermined number of images is set to 48. When the number of image files stored in the memory card is less than 48, the processing, however, goes to and ends in step 410 at the completion of thumbnail exhibition of all images stored in the memory card.

Next, the description is given with reference to the drawings with regard to operation, which a user performs so as to select an image indicated by numeral 204 from the thumbnail exhibition shown in FIG. 2 and display the image 204 on the full screen.

Figure 3:
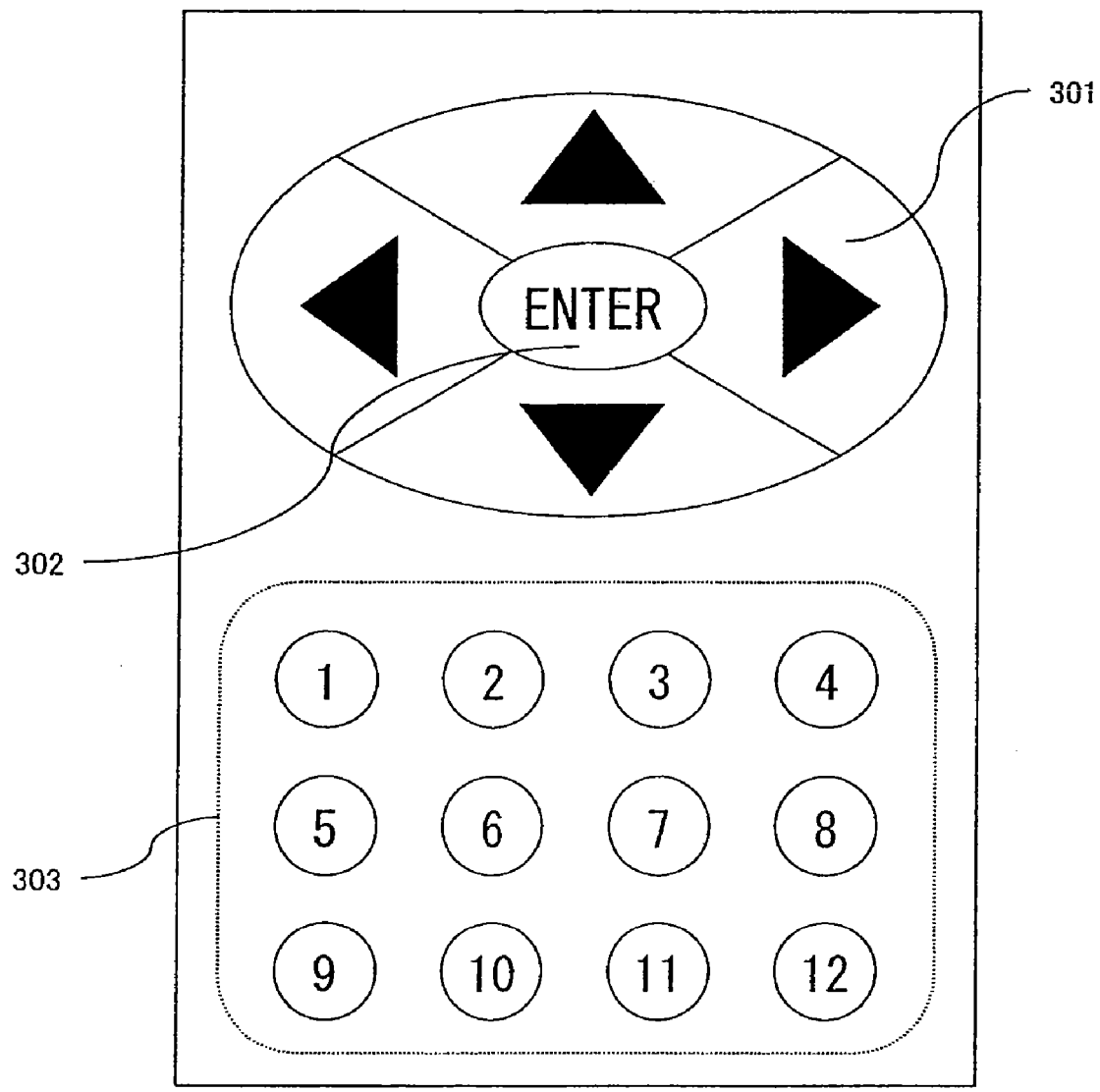
FIG. 3 is an illustration of a remote control according to the related art.
Figure 6:
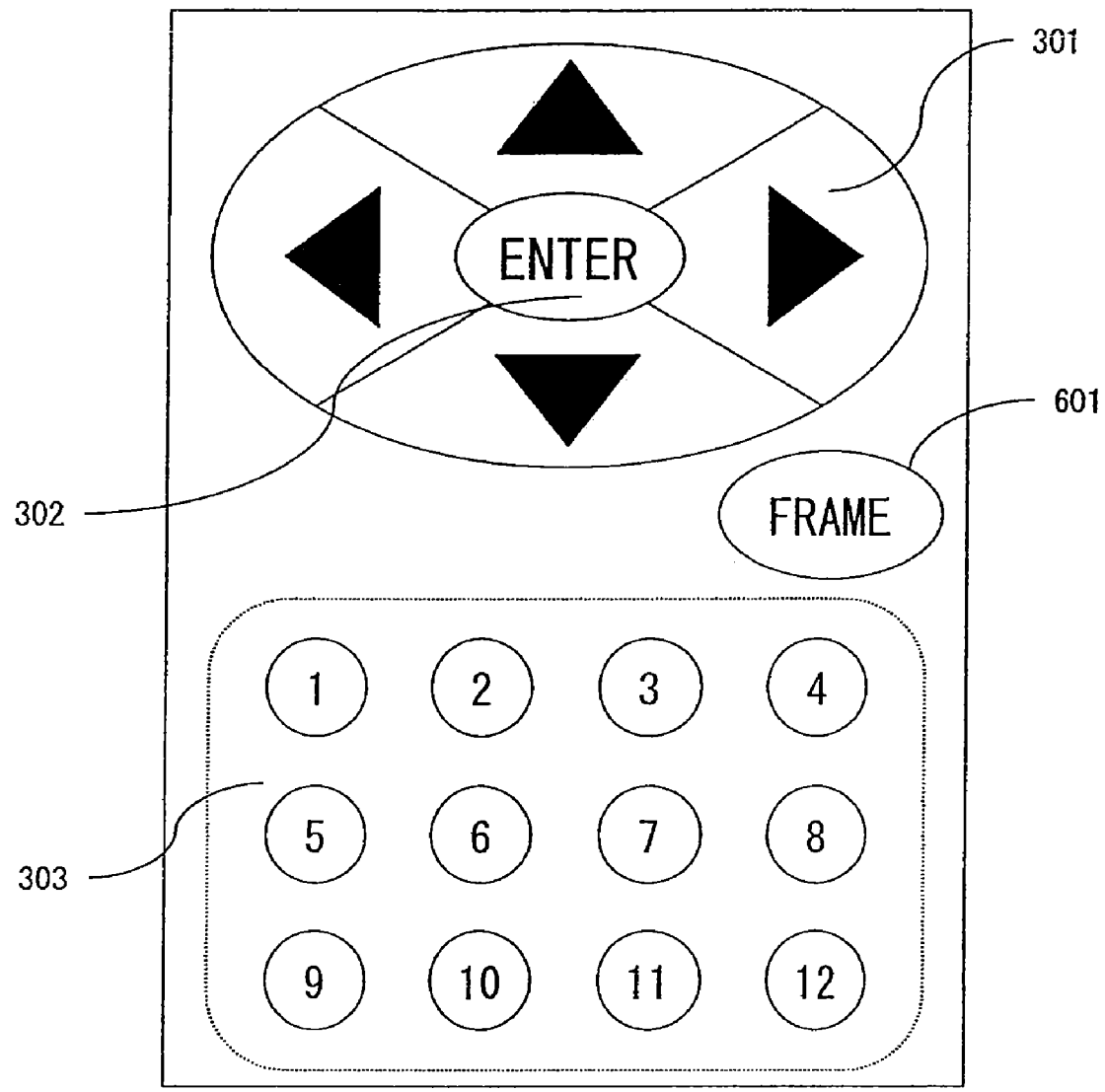
FIG. 6 is an illustration of a remote control according to the first embodiment of the present invention.

FIG. 6 shows the remote control according to the first embodiment. In FIG. 6, parts having the same reference numerals as the parts shown in FIG. 3 have the same functions, and numeral 601 denotes a frame key.

Figure 7:
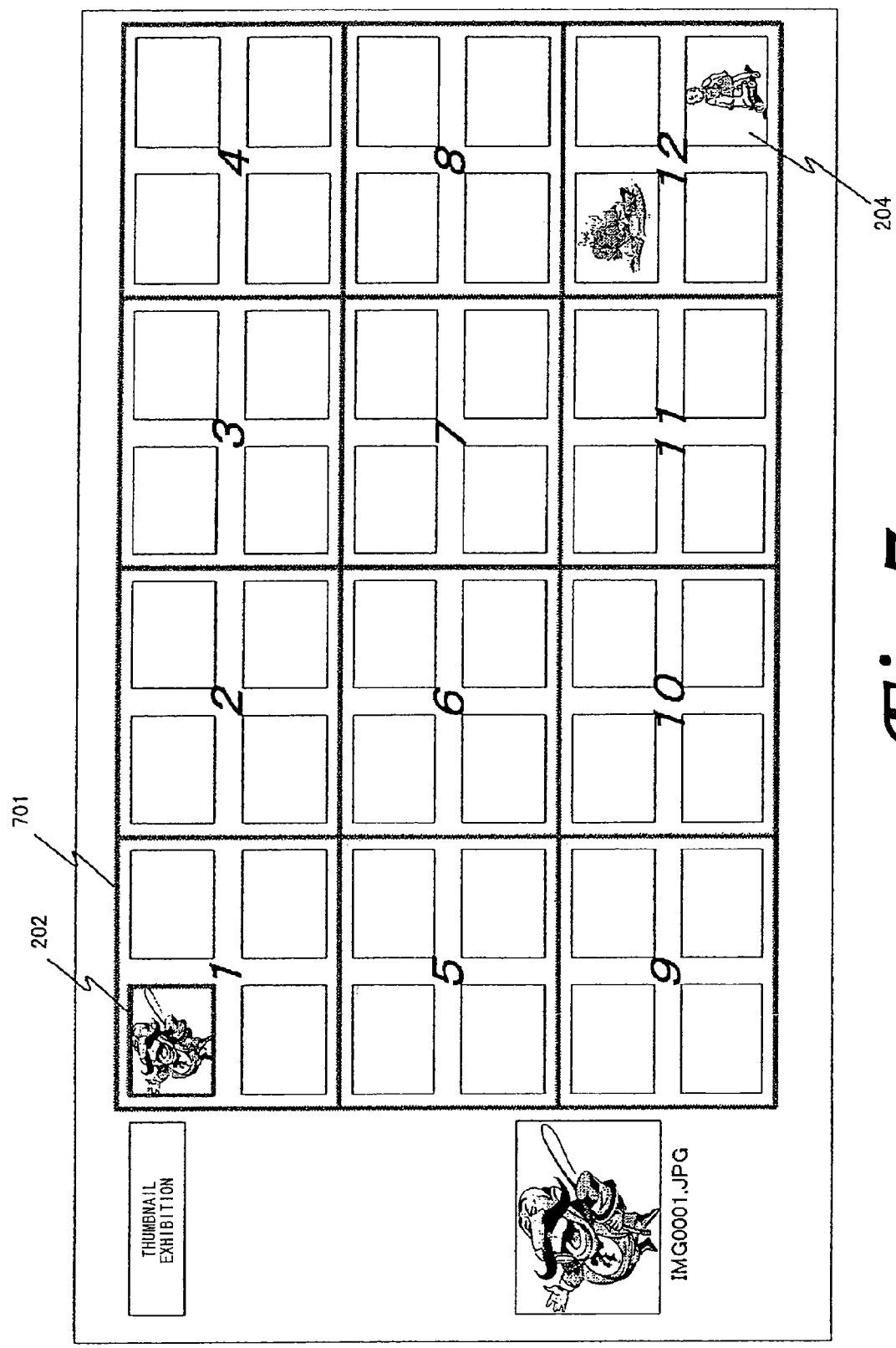
FIG. 7 is an illustration of an example of thumbnail exhibition for many images according to the first embodiment of the present invention.

When the thumbnail exhibition shown in FIG. 2 is displayed, the user presses the frame key 601 shown in FIG. 6. Thus, a screen shown in FIG. 7 appears. As shown in FIG. 7, an auxiliary image 701 shows display frames, each of which selects a thumbnail image display area. Each display frame has one each of numeric values from 1 to 12, both inclusive, which are further displayed as auxiliary images. The number of thumbnail image display areas corresponds to the number of channel keys (that is, area selecting means) indicated by numeral 303 in FIG. 6. In the first embodiment, the number of channel keys is set to 12.

To select the image indicated by numeral 204 in FIG. 7 (which is the same as numeral 204 in FIG. 2), the user first presses the channel key "12" of the channel keys indicated by numeral 303 in FIG. 6. Thus, the screen changes to a screen shown in FIG. 8. As mentioned above, the auxiliary images to limit the range of candidate images for selection are superimposed and displayed on the screen on which many images are simultaneously displayed. This facilitates narrowing down candidate images. The range of candidate images for selection is selected through a unit operation of a first key (that is, the channel keys) of operating means for selecting an image.

Figure 8:
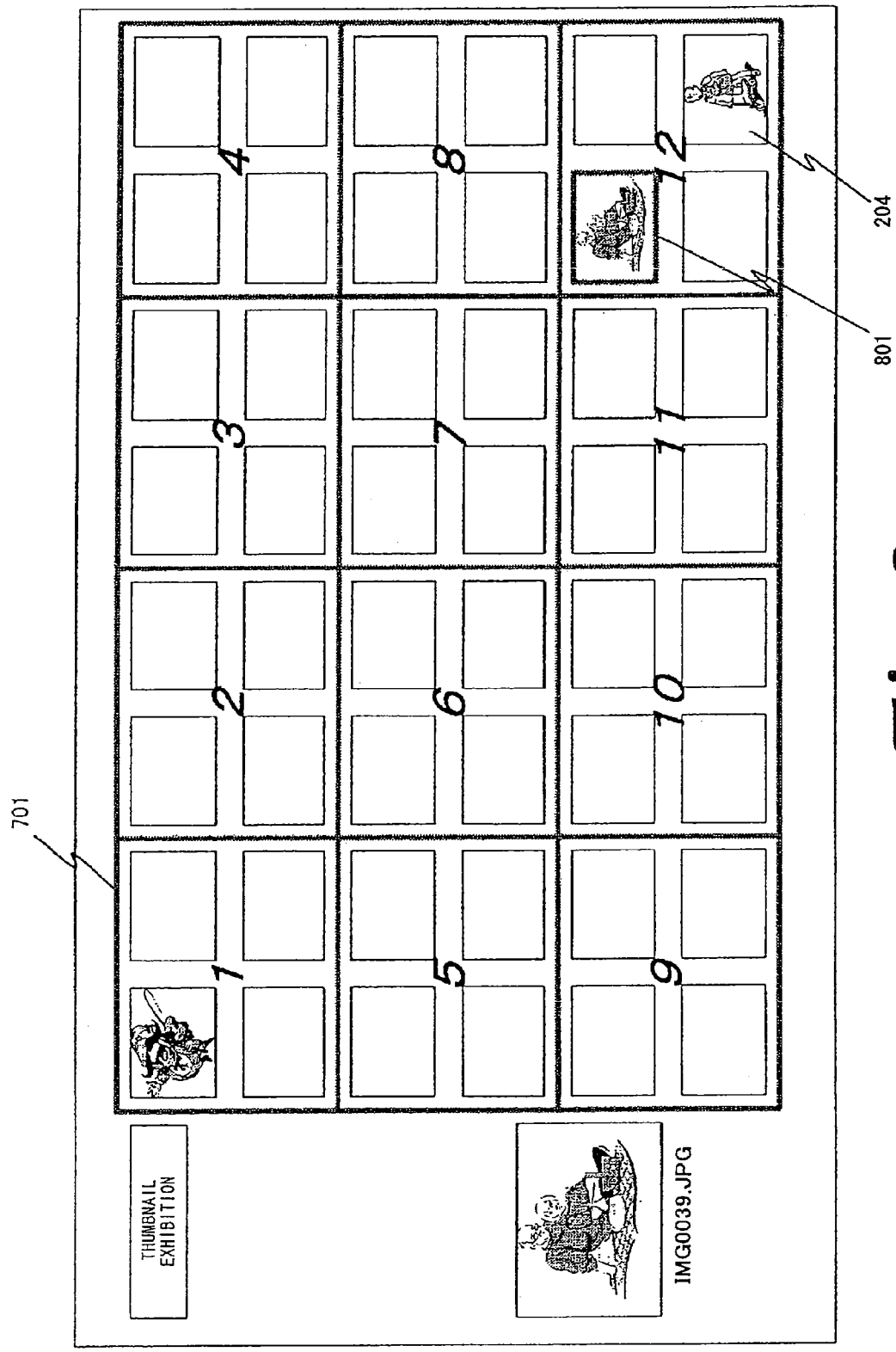
FIG. 8 is an illustration of an example of thumbnail exhibition for many images according to the first embodiment of the present invention.

Numeral 801 in FIG. 8 indicates the same focus frame as the focus frame designated by numeral 202 in FIGS. 2 and 7. When thumbnail exhibition is displayed as shown in FIG. 8, the user uses the cursor keys (that is, operating means) 301 shown in FIG. 6 so as to move the focus frame 801 to the position of the thumbnail image indicated by numeral 204 in FIG. 8 (which is the same as numeral 204 in FIG. 7). Then, the user presses an Enter key 302 shown in FIG. 6 so as to display the image on the full screen. As mentioned above, one of the channel keys is operated to select a group of images, and then a second key (that is, the cursor keys and the Enter key) is operated to select one image from the group of images. This allows a further improvement in ease of operation.

As described above, according to the method of the first embodiment, a total of at least four user operations of the remote control, that is, one press of the frame key, at least two presses of the cursor keys, and one press of the Enter key, allows selecting and displaying the image indicated by numeral 204, when starting at the position of the image focused by the focus frame 202 shown in FIG. 2. Therefore, the method of the first embodiment can reduce the number of operations by 9 and thus solve the problem of impairing ease of operation, as compared to the prior art having the foregoing problem of requiring at least 13 operations.

Second Embodiment

Next, a second embodiment of the present invention will be described with reference to the drawings. The configuration of an image display device according to the second embodiment, which the present invention is to be applied to, is the same as the configuration of the image display device according to the first embodiment shown in a block diagram of FIG. 1.

Figure 9:
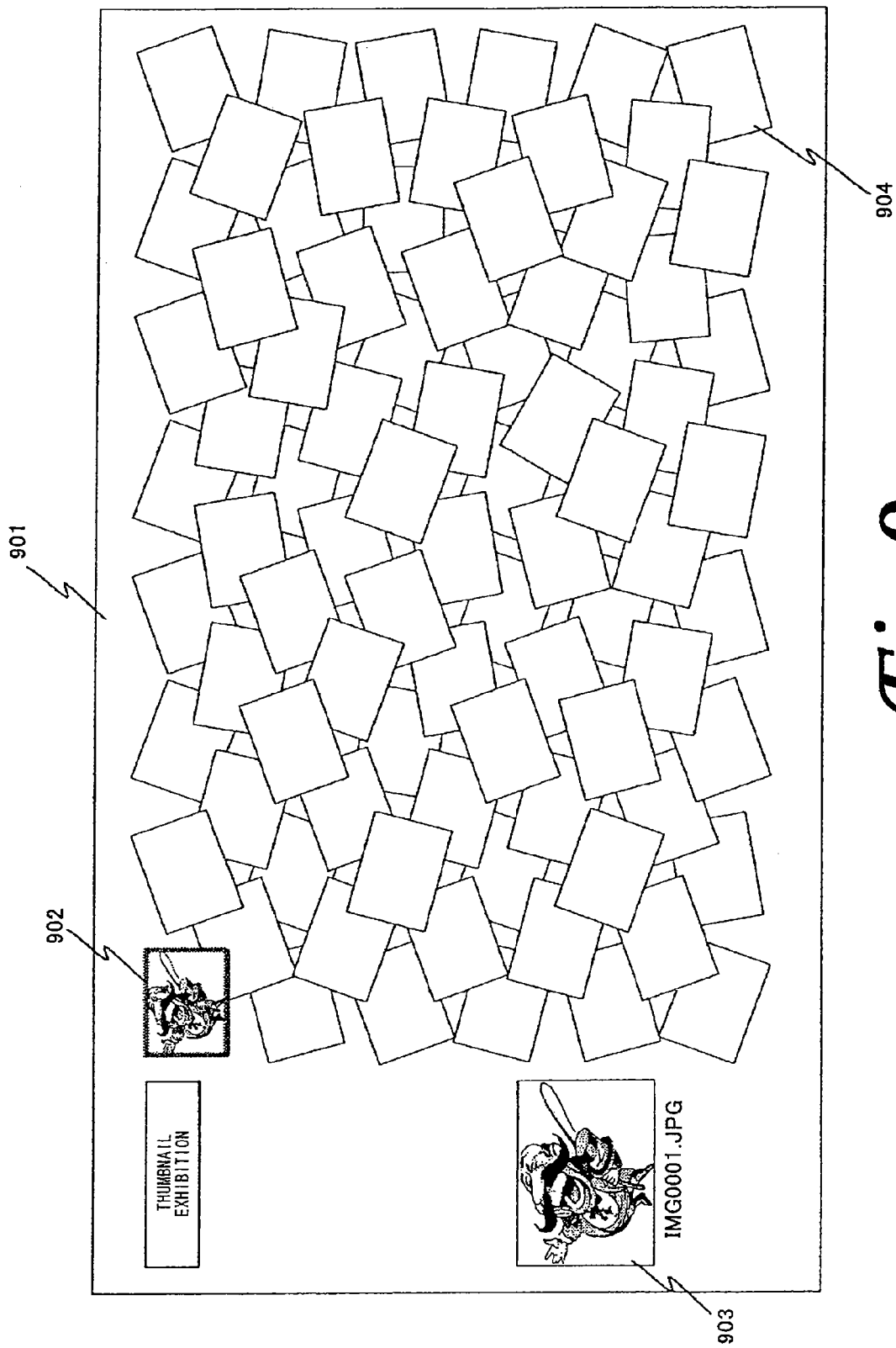
FIG. 9 is an illustration of an example of thumbnail exhibition for many images according to the second embodiment of the present invention.

FIG. 9 shows thumbnail exhibition according to the second embodiment. The thumbnail exhibition shown in FIG. 9 is such that exhibition of more images is displayed on one screen, and that users receive the impression that printed silver halide photographs are scattered on a desk so as to select a photograph.

In the thumbnail exhibition, at least one (for example, 47 images) of many images is displayed as rotated by a predetermined angle θ (0°<θ<360°) with respect to reference directions in the screen. As employed herein, the reference directions refer to a direction horizontal to the widthwise side of the image and a direction parallel to the lengthwise side thereof, which are parallel to the widthwise and lengthwise sides, respectively, of the screen.

Referring to FIG. 9, numeral 901 denotes a full television display screen, numeral 902 denotes a focus frame indicating a current candidate image for selection, numeral 903 denotes a candidate image display which displays on a sub-screen an image currently focused by the focus frame 902 and its file name, and numeral 904 denotes a thumbnail image on thumbnail exhibition, which is diagonally opposite to the image currently focused by the focus frame 902.

Figure 10:
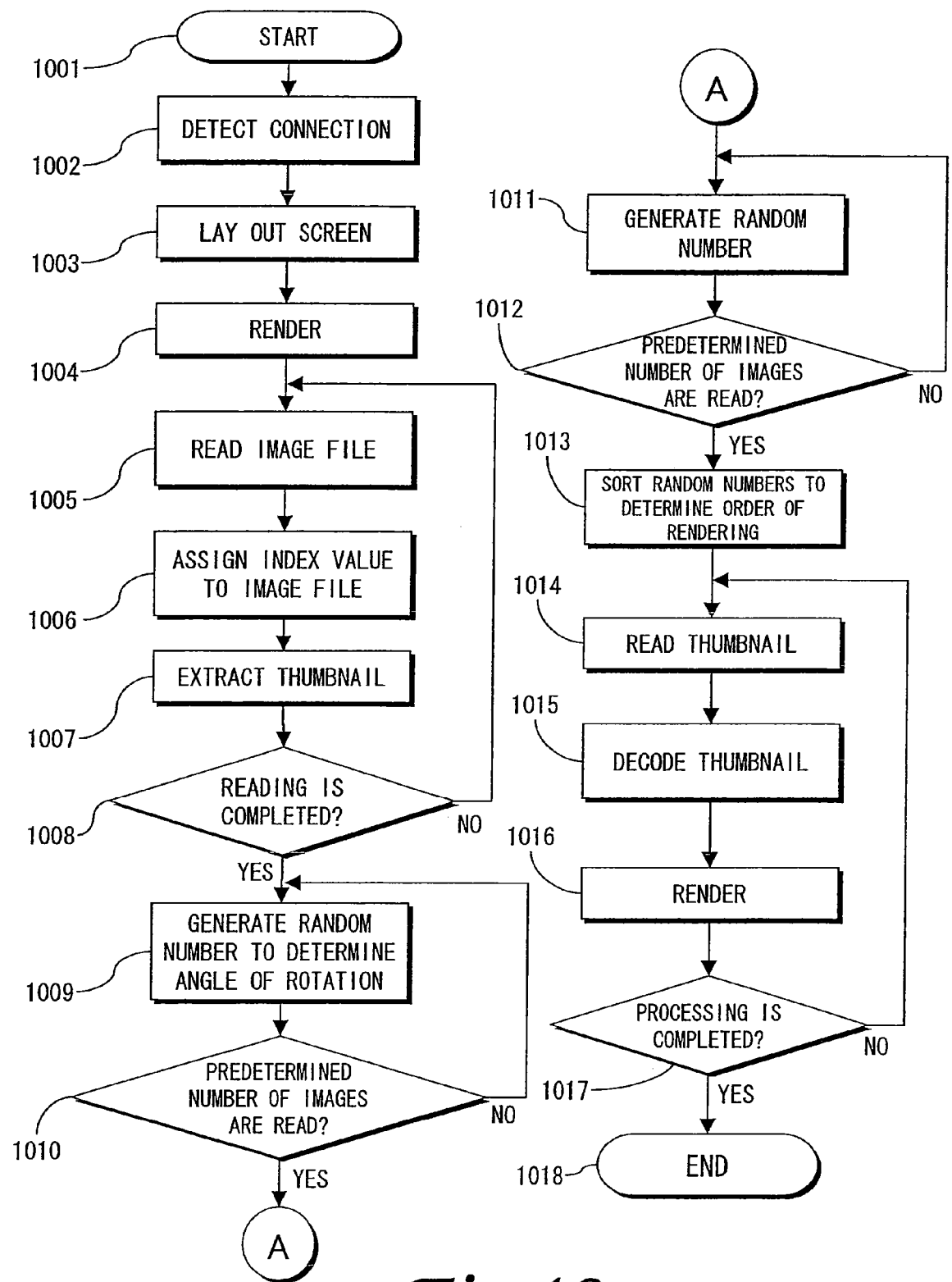
FIG. 10 is a flowchart of operation according to the second embodiment of the present invention.

FIG. 10 shows the flow of operation, which takes place between the connection of a memory card (not shown) to the memory card controller 101 shown in FIG. 1 and the display of thumbnail exhibition shown in FIG. 9 on the image display 111.

In step 1001 of FIG. 10, a user connects the memory card to the memory card controller 101 shown in FIG. 1. In this case, the memory card has many images stored therein, which are picked up by a DSC, a DVC, or the like.

In step 1002 of FIG. 10, when the memory card controller 101 shown in FIG. 1 detects the connection of the memory card, the memory card controller 101 supplies to the CPU 102 information indicating the detection of connection.

In step 1003 of FIG. 10, under control of the CPU 102 shown in FIG. 1, display data required for thumbnail image exhibition (except for thumbnail image data), specifically such as background data to be displayed on the full display screen 901 shown in FIG. 9, is transferred via the control bus 106 to the screen layout 109, which then lays out a screen using the display data.

In step 1004 of FIG. 10, the display data is supplied to the display controller 110, which then causes the image display 111 to render and display the display data.

In step 1005 of FIG. 10, under control of the CPU 102 shown in FIG. 1, one of image files stored in the memory card is read into the memory 103 via the control bus 106 and the memory card controller 101.

In step 1006 of FIG. 10, under control of the CPU 102 shown in FIG. 1, an index value is assigned to the read image file. In step 1007 of FIG. 10, thumbnail image information is extracted from the image file.

Figure 11:
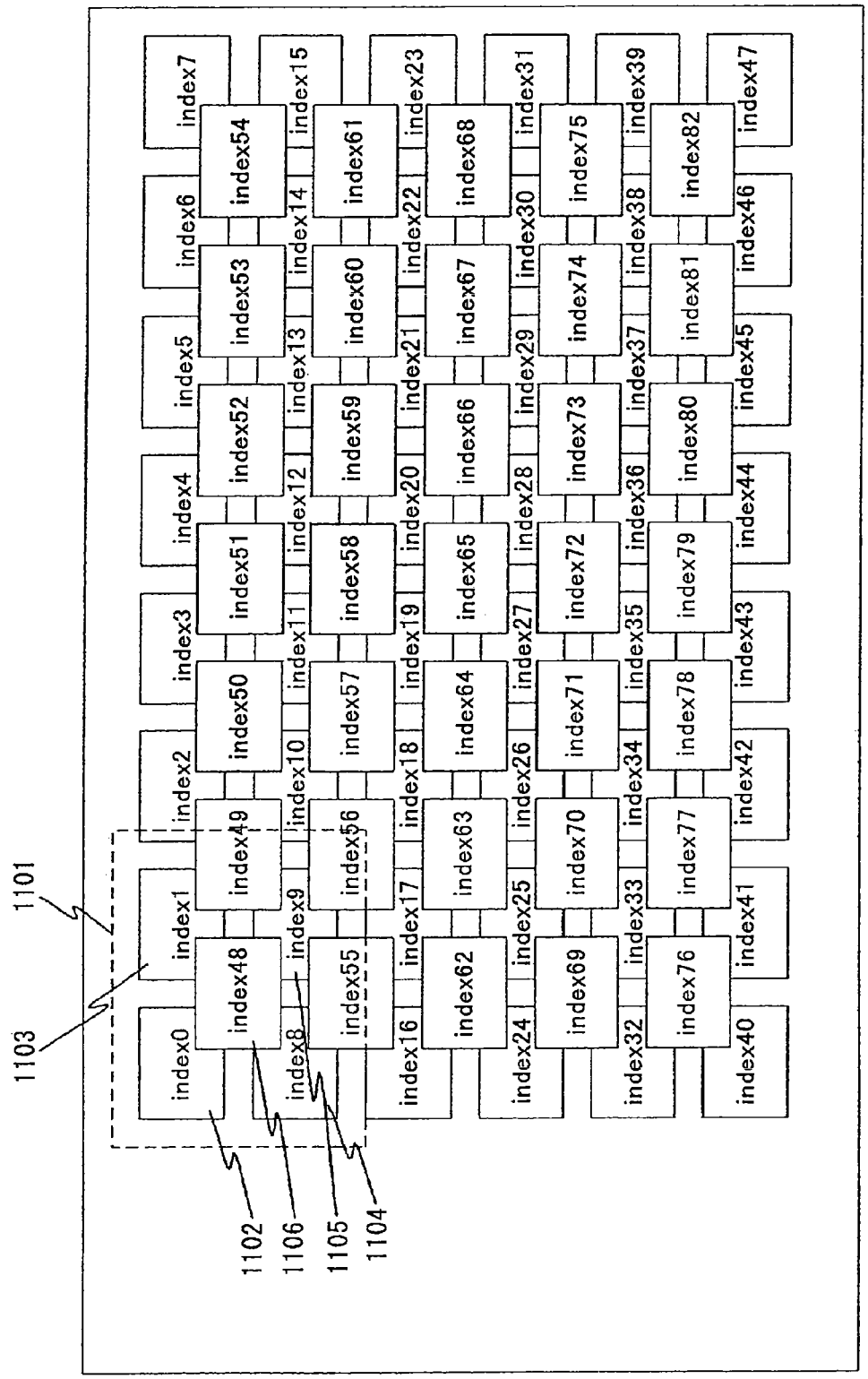
FIG. 11 is a conceptual illustration of the arrangement of thumbnail images in the thumbnail exhibition for many images according to the second embodiment of the present invention.
Figure 12:
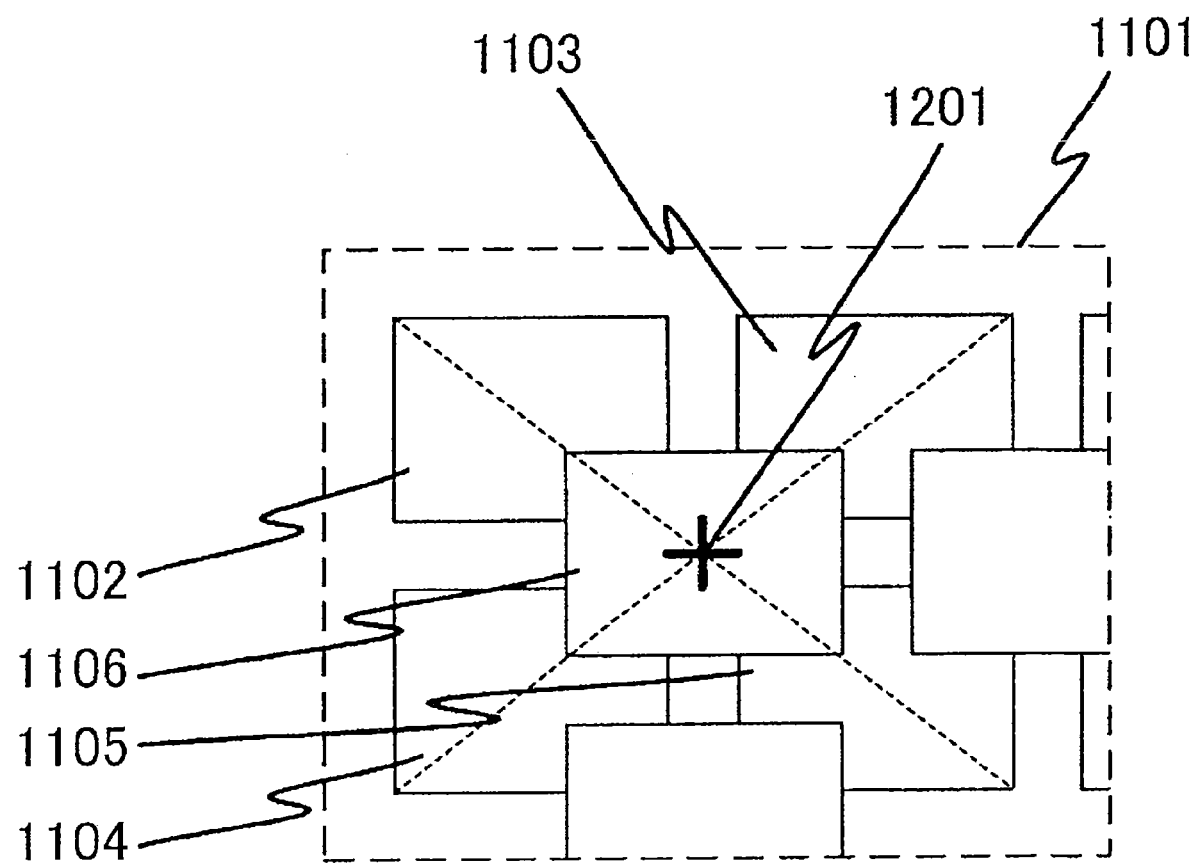
FIG. 12 is a conceptual illustration of the arrangement of thumbnail images in the thumbnail exhibition for many images according to the second embodiment of the present invention.

The above-mentioned steps 1005 to 1007 of FIG. 10 are repeatedly executed times equivalent to the number of images that can be simultaneously displayed on one screen. FIG. 11 shows, in virtual representation, the index values assigned to the images in step 1006 and the relative positions of the images. FIG. 12 shows only a part indicated by numeral 1101 in FIG. 11. FIG. 11 does not show the images as actually rendered and displayed on the image display 111 shown in FIG. 1 but virtually shows the index values and the relative positions of the images as mentioned above. Referring to FIG. 11, numerals 1102, 1103, 1104, 1105, and 1106 denote the images having the assigned index values 0, 1, 8, 9, and 48, respectively.

When the above-mentioned steps 1005 to 1007 of FIG. 10 are repeatedly executed, the index value is assigned to each image in step 1006 so that the index value is incremented by 1, starting at 0, each time the image file is read in. The relative positions of the thumbnail images having the index values 0 to 47 shown in FIG. 11 are the same as the relative positions of the thumbnail images of the thumbnail exhibition shown in FIG. 2. Thus, the image focused by the focus frame 202 shown in FIG. 2 corresponds to the image having the index value 0 shown in FIG. 11, and the image indicated by numeral 204 in FIG. 2 corresponds to the image having the index value 47 shown in FIG. 11. The same reference numerals in FIG. 12 as the reference numerals in FIG. 11 indicate the same images, and numeral 1201 in FIG. 12 denotes the position of the center of the image having the index value 48, which is designated by numeral 1106 in FIG. 11. The images having the index values 48 to 82 shown in FIG. 11 are arranged in the following manner. As shown in FIG. 12 taking as an example the image 1106 having the index value 48, the image 1106 having the index value 48 is positioned relative to four images 1102 to 1105 around the image 1106 so that the center of the image 1106 having the index value 48 coincides with the point of intersection of a line connecting the upper left corner of the image 1102 having the index value 0 to the lower right corner of the image 1105 having the index value 9 and a line connecting the upper right corner of the image 1103 having the index value 1 to the lower left corner of the image 1104 having the index value 8. In the second embodiment, the maximum number of images that are arranged on one screen in this manner is set to 83. In other words, the images, of many images mentioned above, belonging to a first group (that is, the images having the index values 0 to 47) are spaced at predetermined intervals and arranged in a two-dimensional matrix, and the images belonging to a second group (that is, the images having the index values 48 to 82) are spaced at predetermined intervals and arranged in a two-dimensional matrix. Then, the respective images of the first and second groups are spaced and arranged at shorter intervals, each of which is equal to half the predetermined interval. Thus, the reference positions of the images are determined. Thereafter, as will be described later, each image is rotated in a plane about its center at its reference position, and thus the order of overlapping is determined. Thus, all the images are displayed with efficiency.

In step 1008 of FIG. 10, under control of the CPU 102 shown in FIG. 1, determination is then made as to whether a maximum number of images, that is, 83 images, are read in or whether all the images stored in the memory card are read in. At the completion of reading (Yes in step 1008), the processing goes to a next step.

In step 1009 of FIG. 10, under control of the CPU 102 shown in FIG. 1, the angle θ of rotation of each thumbnail image (0°<θ<360°) is determined in ascending order of index value. Incidentally, a reference direction is set to a horizontal direction. In this step, a random number is generated by software so that the angle θ of rotation lies between −180 and 180° (this range is equivalent to the range of from 0 to 360°, both exclusive (0<θ<360)), or preferably between −90 and 90°. Thus, the generated random number value is used as the angle θ of rotation of each image. For example when the random number value is equal to 47, the image is clockwise rotated by 47° about the image center indicated by numeral 1201 in FIG. 12. When the random number value is equal to −30, the image is counterclockwise rotated by 30°. Under control of the CPU 102 shown in FIG. 1, step 1009 is repeatedly executed. Then, determination is made as to whether a maximum number of images, that is, 83 images, are read in or whether all the images stored in the memory card are read in (in step 1010 of FIG. 10). At the completion of reading (Yes in step 1010), the processing goes to a next step 1011.

In step 1011 of FIG. 10, under control of the CPU 102 shown in FIG. 1, a random number is again generated for use in a later step 1013 of determining the order in which the thumbnail images are to be rendered. In this case, software is configured to generate a random number lying between 0 and 32767 inclusive. Under control of the CPU 102 shown in FIG. 1, step 1011 is repeatedly executed. Then, determination is made as to whether a maximum number of images, that is, 83 images, are read in or whether all the images stored in the memory card are read in (in step 1012 of FIG. 10). At the completion of reading (Yes in step 1012), the processing goes to a next step.

In step 1013 of FIG. 10, the order of rendering is determined by sorting the random number values generated in the above-mentioned step 1011 in ascending numeric order. For example when the indexes 50 and 51 have the random number values "1203" and "98", respectively, the image having the index 51 is rendered earlier than the image having the index 50. In the case of the same random number value, an image having a smaller index value is rendered earlier.

In step 1014 of FIG. 10, under control of the CPU 102 shown in FIG. 1, the thumbnail image extracted in the above-mentioned step 1007 is read from the memory 103 shown in FIG. 1 according to the order of rendering determined in the preceding step 1013. The thumbnail image is supplied to the image decoder 108, which then decodes the thumbnail image (in step 1015 of FIG. 10). In step 1016 of FIG. 10, the decoded thumbnail image data is supplied to the display controller 110 shown in FIG. 1, which then causes the image display 111 to render and display the thumbnail image.

The above-mentioned steps 1014 to 1016 of FIG. 10 are repeatedly executed until a maximum number of images, that is, 83 images, are read in or all the images stored in the memory card are read in. Then, when the processing goes to and ends in step 1018, the thumbnail exhibition shown in FIG. 9 is displayed.

Next, the description is given with reference to the drawings with regard to operation, which a user performs so as to select the image indicated by numeral 904 from the thumbnail exhibition shown in FIG. 9 and display the image 904 on the full screen. A remote control for use in the second embodiment is the same as the remote control according to the first embodiment shown in FIG. 6. When the user selects at least one of many images mentioned above, which is displayed as rotated by a predetermined angle θ (0°<θ<360°) with respect to the reference directions in the screen, the image is displayed so that the image is oriented in accordance with the reference directions.

Figure 13:
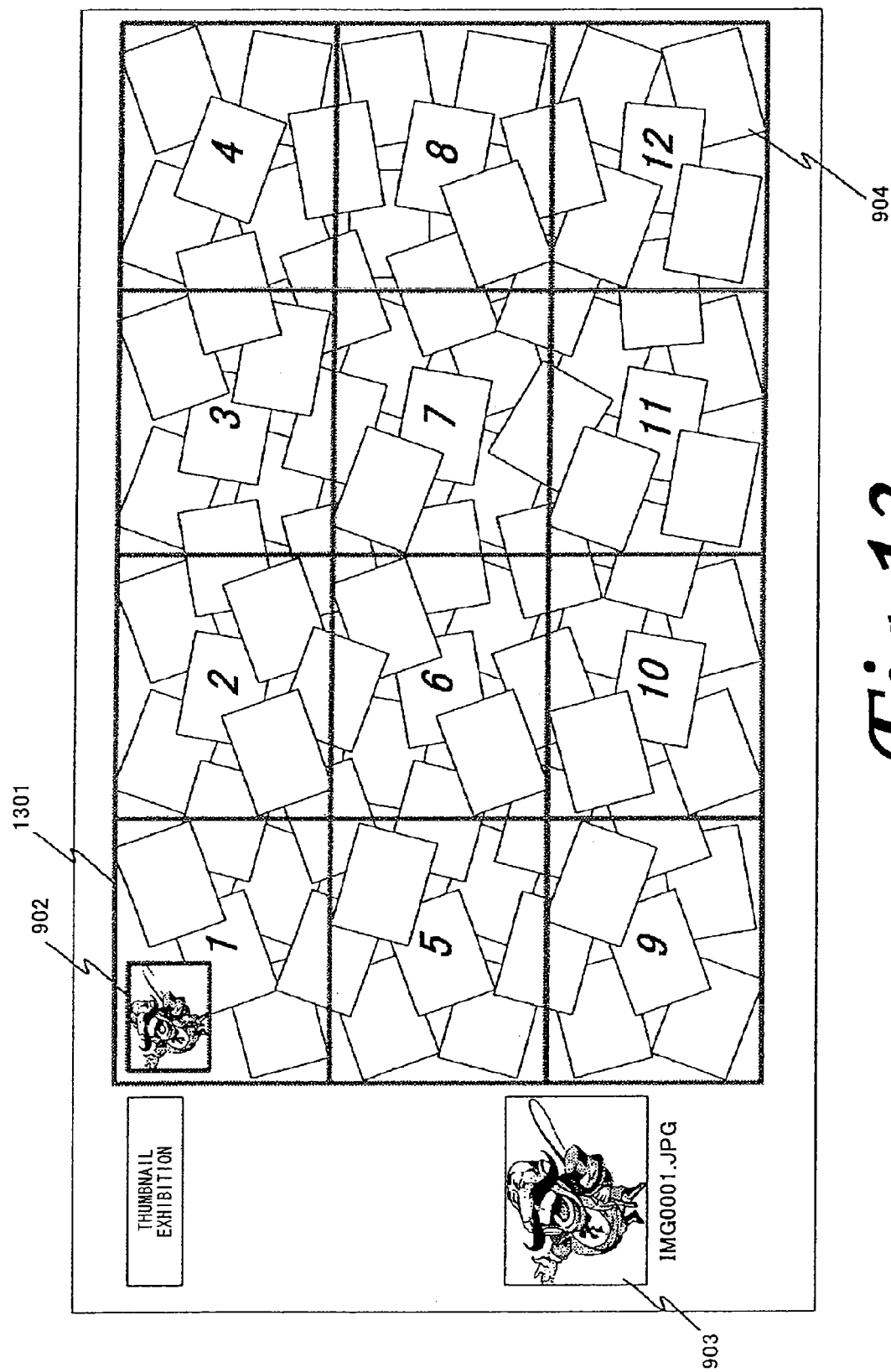
FIG. 13 is an illustration of an example of thumbnail exhibition for many images according to the second and fifth embodiments of the present invention.

When the thumbnail exhibition shown in FIG. 9 is displayed, the user presses the frame key 601 shown in FIG. 6. Thus, a screen shown in FIG. 13 appears. As shown in FIG. 13, an auxiliary image 1301 shows display frames, each of which selects a thumbnail image display area. Each display frame has one each of numeric values from 1 to 12, both inclusive, which are further displayed as auxiliary images. The number of thumbnail image display areas corresponds to the number of channel keys (that is, area selecting means) indicated by numeral 303 in FIG. 6. In the second embodiment, the number of channel keys is set to 12, as in the case of the first embodiment. To select the image indicated by numeral 904, the user first presses the channel key "12" of the channel keys indicated by numeral 303 in FIG. 6. Thus, a screen shown in FIG. 14 appears.

Figure 14:
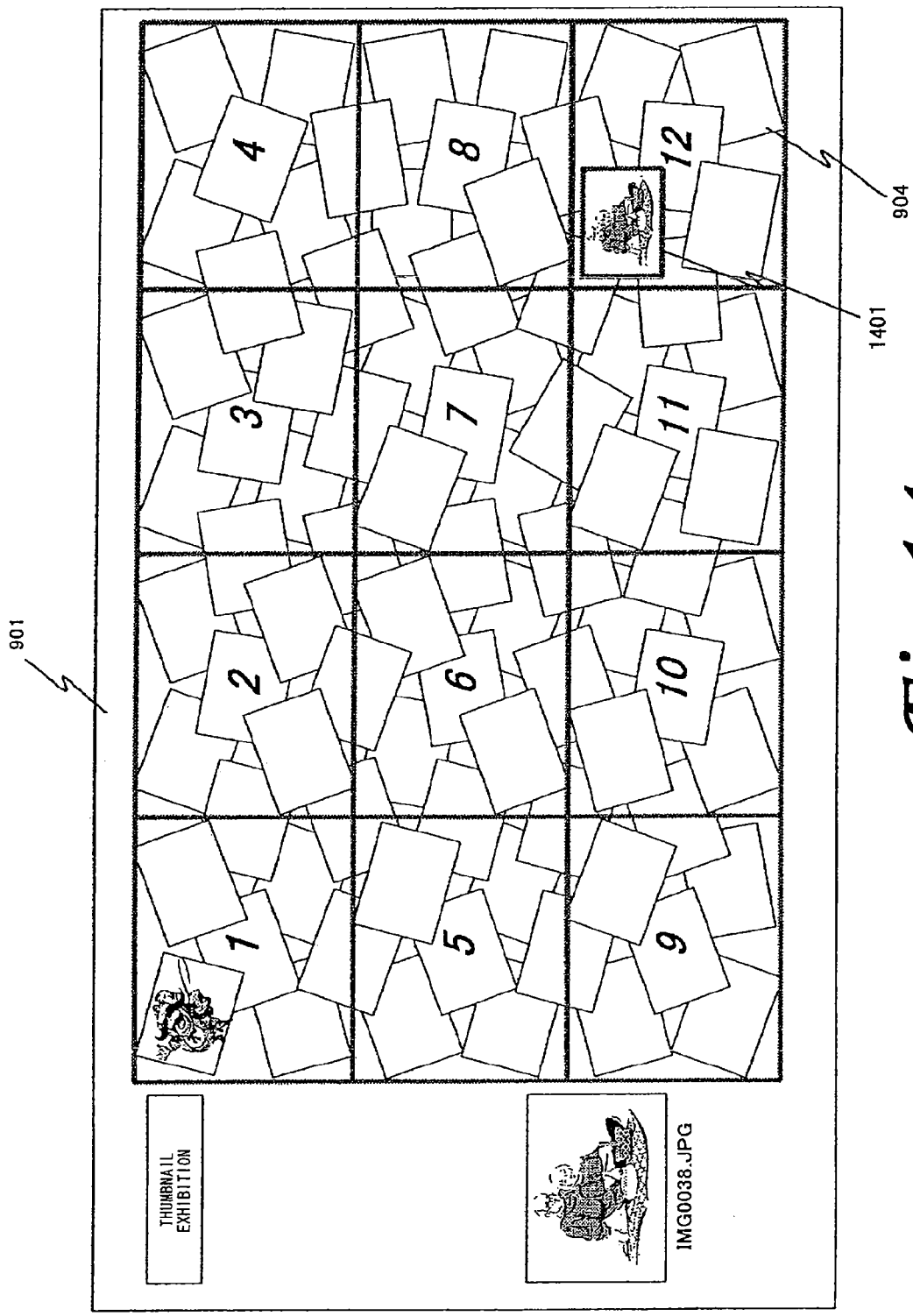
FIG. 14 is an illustration of an example of thumbnail exhibition for many images according to the second and third embodiments of the present invention.

Numeral 1401 in FIG. 14 indicates the same focus frame as the focus frame 902 shown in FIGS. 9 and 13. An image focused by the focus frame 1401 is displayed so that the image is restored to its original position and thus oriented in accordance with the reference directions. Then, the focused image can be displayed on the full screen through the press of the Enter key 302 shown in FIG. 6. To improve the visibility of the focused image and thus make it easy for the user to select the focused image, the focused thumbnail image is rotated so that four sides, that is, top, bottom, right, and left sides, of the focused image are parallel to those of the full display screen 901, respectively. Moreover, the focused image is again rendered so that the focused image is moved and thus superimposed at the topmost position on overlapping thumbnail images.

When thumbnail exhibition is displayed as shown in FIG. 14, the user uses the cursor keys (that is, operating means) 301 shown in FIG. 6 so as to move the focus frame 1401 to the position of the thumbnail image indicated by numeral 904 in FIG. 14. Then, the user presses the Enter key 302 shown in FIG. 6 so as to display the image on the full screen 901.

When the thumbnail exhibition shown in FIG. 14 is displayed, two presses of the cursor key that permits a downward movement enable moving the focus frame 1401 to the position of the thumbnail image indicated by numeral 904 in FIG. 14. In this case, the direction of movement of the cursor is determined according to the area of an overlap portion of the focused image and each of plural images located in the direction of movement.

Figure 15:
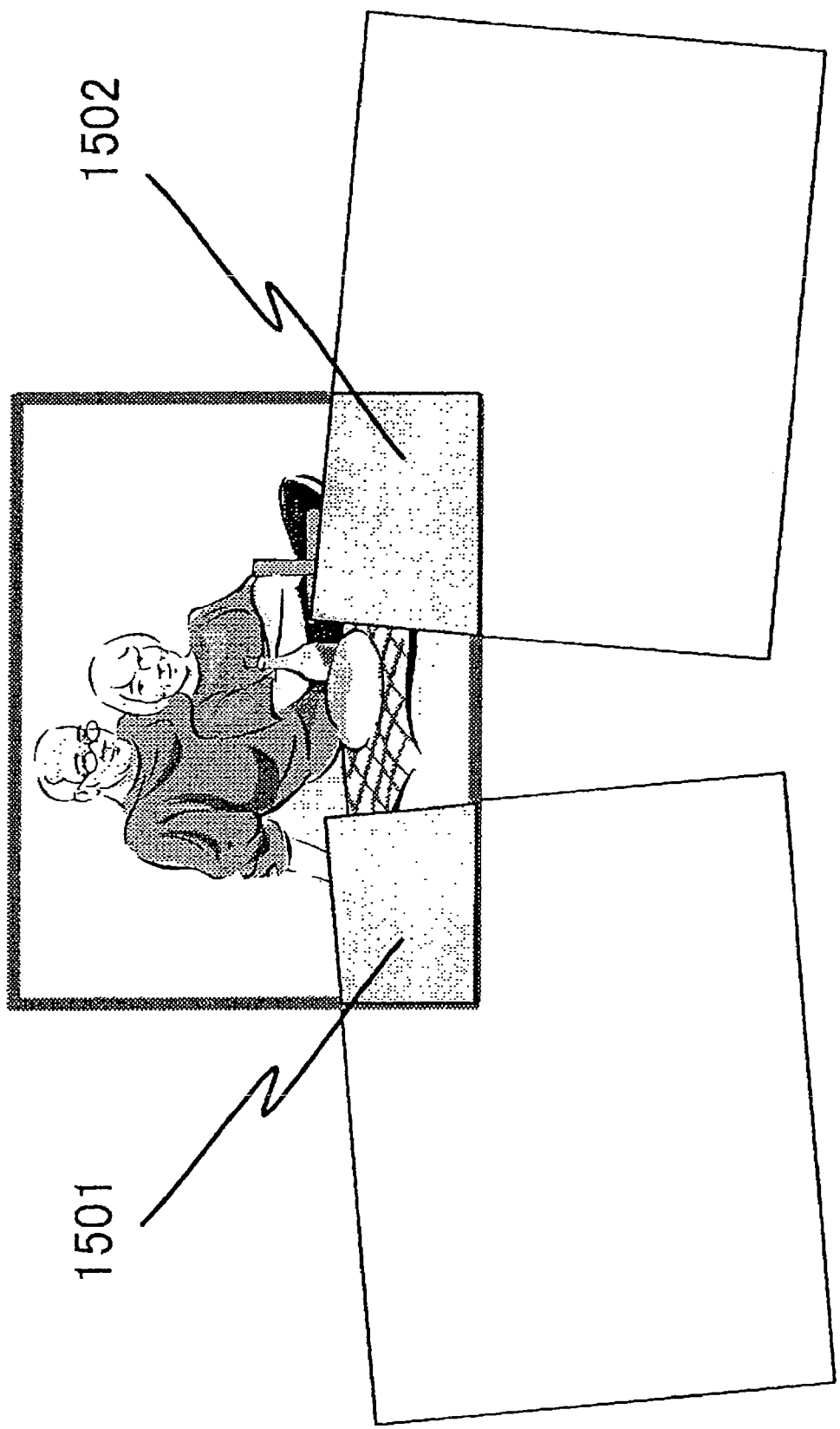
FIG. 15 is an illustration of overlap portions of a plurality of images according to the second embodiment of the present invention.

Numerals 1501 and 1502 in FIG. 15 indicate overlap portions of images. In the instance illustrated in FIGS. 14 and 15, the area of the lower right overlap portion 1502 is larger than the area of the lower left overlap portion 1501. Thus, the focus frame 1401 shown in FIG. 14 is moved to a lower right image having the overlap portion having a larger area.

As described above, a total of four or five operations of the remote control, that is, one press of the frame key, at least two presses of the cursor keys or three presses of the cursor keys depending on the area of the overlap portion as shown in FIG. 15, and one press of the Enter key, allows displaying the image indicated by numeral 904 on the full screen, when starting at the position of the image focused by the focus frame 902 shown in FIG. 9. Therefore, the method of the second embodiment can reduce the number of operations by 9 or 8 and thus improve ease of operation, as compared to the prior art having the foregoing problem of requiring 13 operations.

Third Embodiment

Figure 16:
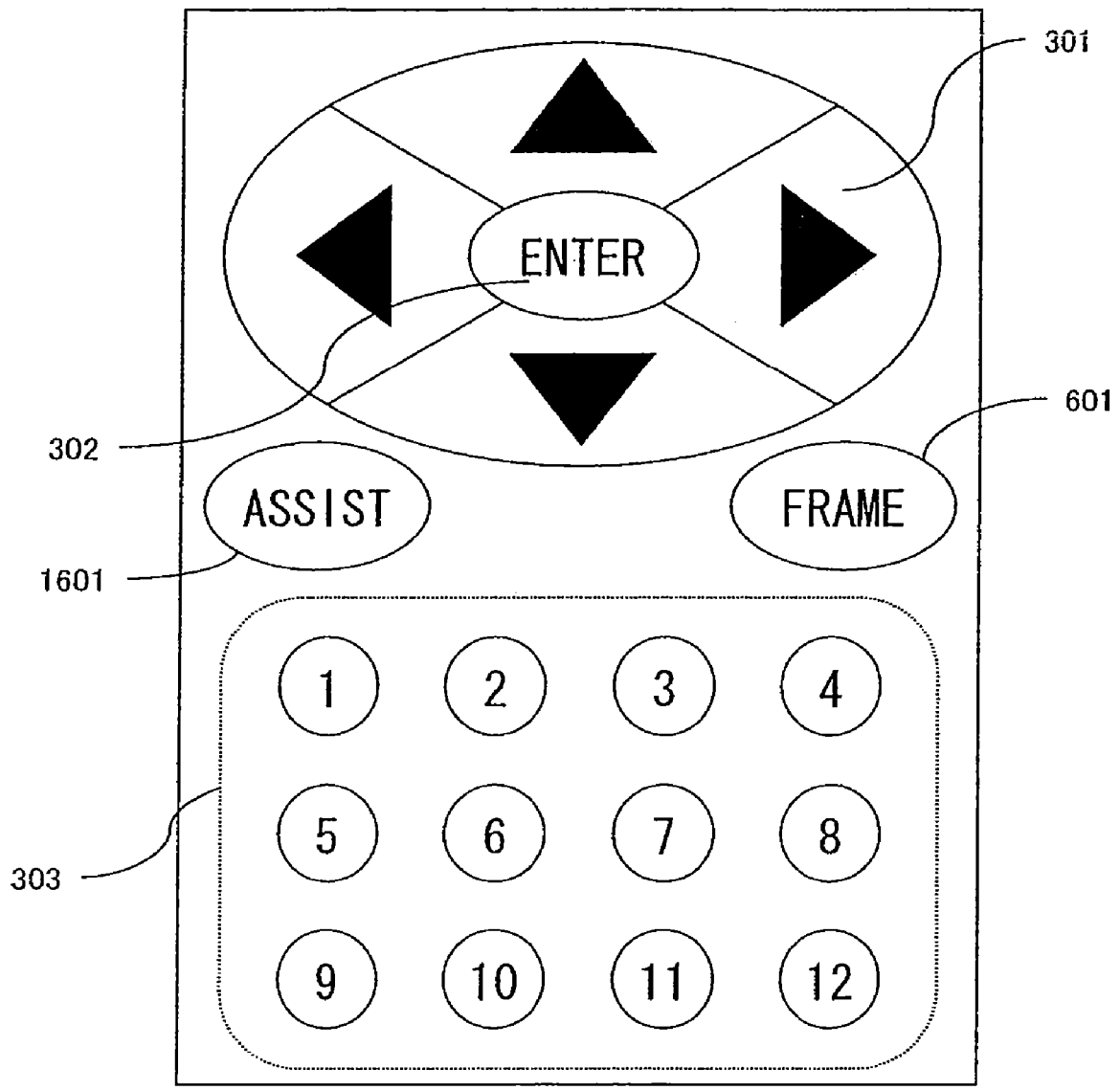
FIG. 16 is an illustration of a remote control according to the third embodiment of the present invention.

Next, a third embodiment of the present invention will be described with reference to the drawings. The configuration of an image display device according to the third embodiment, which the present invention is to be applied to, is the same as the configuration of the image display device according to the first and second embodiments shown in FIG. 1. FIG. 16 shows a remote control for use in the third embodiment. In FIG. 16, parts having the same reference numerals as the parts shown in FIG. 6 have the same functions. In FIG. 16, numeral 1601 denotes an assist key.

When the thumbnail exhibition of the above-mentioned second embodiment shown in FIG. 14 is displayed, a user presses the assist key 1601 shown in FIG. 16. Thus, a screen shown in FIG. 17 appears. Auxiliary images 1701, 1702, 1703, and 1704 shown in FIG. 17 are assist display images which indicate upward, rightward, downward, and leftward directions, respectively, in which the focus frame 1401 can be moved through the presses of the up, right, down, and left cursor keys (that is, operating means) 301 of the remote control shown in FIG. 16.

Figure 17:
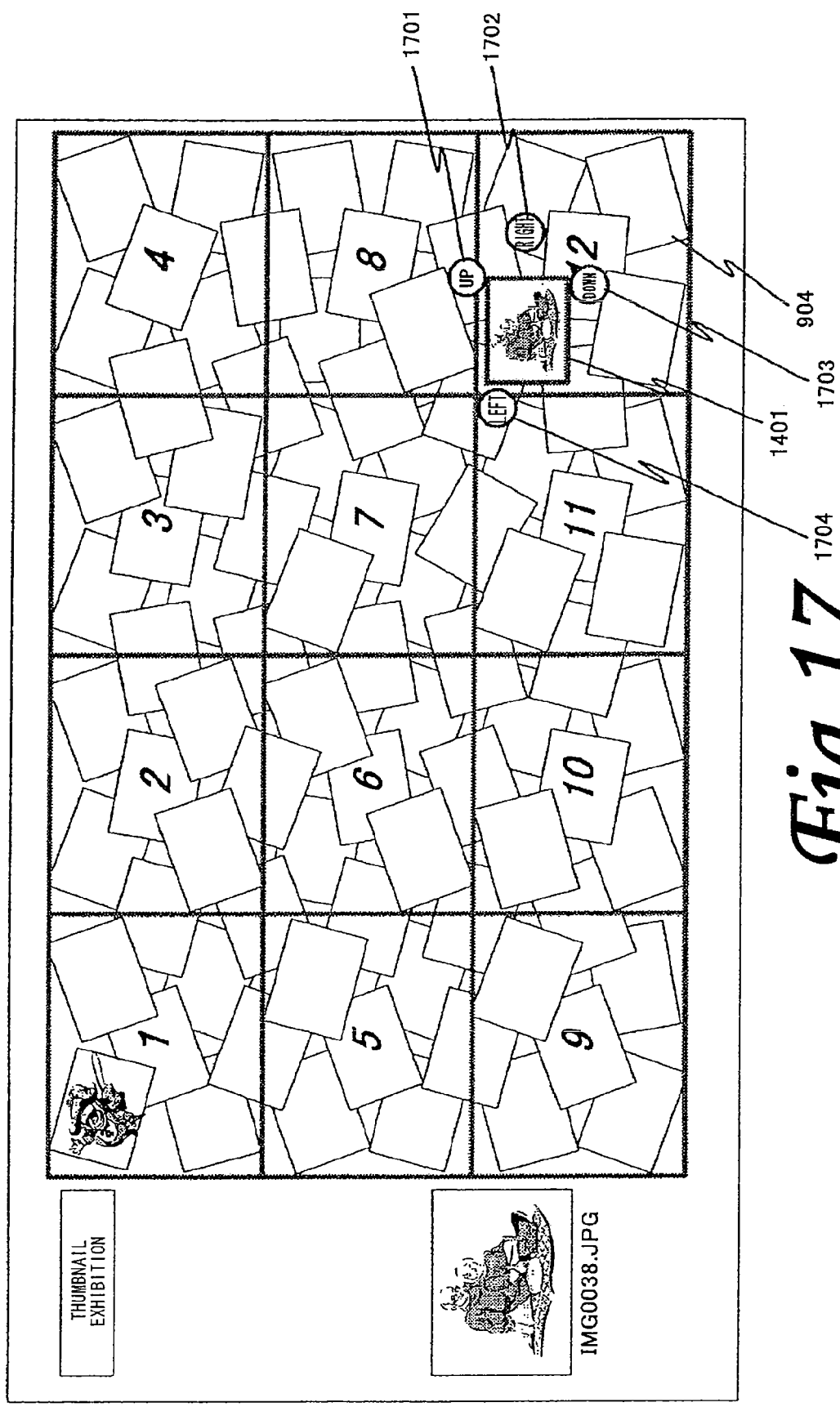
FIG. 17 is an illustration of an example of thumbnail exhibition for many images according to the third embodiment of the present invention.
Figure 18:
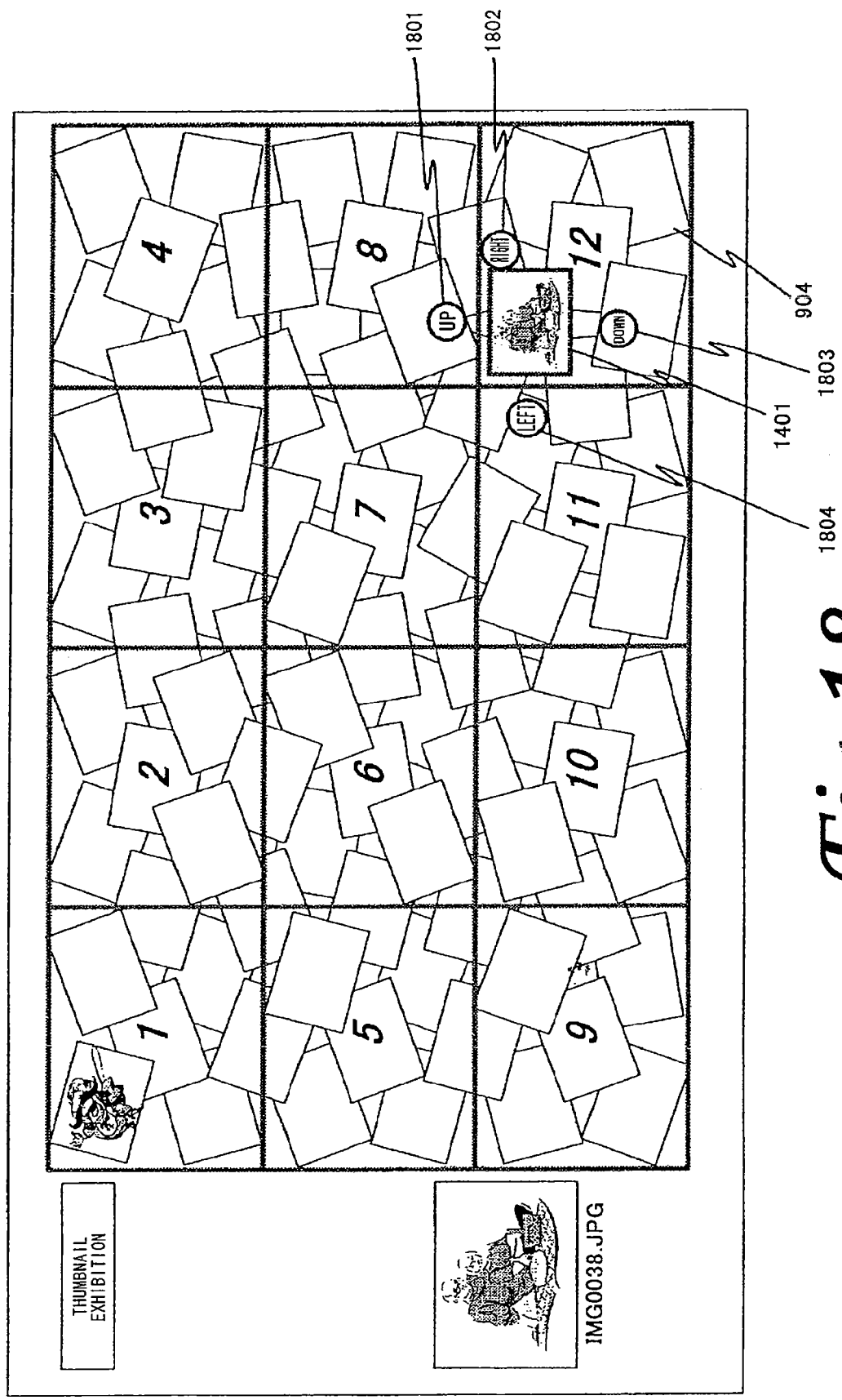
FIG. 18 is an illustration of an example of thumbnail exhibition for many images according to the third embodiment of the present invention.

When thumbnail exhibition is displayed as shown in FIG. 17, the user presses the assist key 1601 shown in FIG. 16. As shown by auxiliary images 1801, 1802, 1803, and 1804 shown in FIG. 18, the press of the assist key 1601 enables changing the positions of the assist display images which indicate the directions in which the focus frame 1401 can be moved through the presses of the up, right, down, and left cursor keys 301 of the remote control shown in FIG. 16.

Therefore, the method of the third embodiment allows the user to perform operation in accordance with the assist display images, and thus permits the user to move the focus frame 1401 and select any thumbnail image without having difficulty in operating the cursor keys 301. Accordingly, the method of the third embodiment can improve ease of operation.

In particular when images, which overlap one another so as to be partially exposed, are displayed as rotated or randomly arranged, it may be difficult to determine which image can be selected by means of the up, down, right, or left key. In this case, the auxiliary images are effective.

Fourth Embodiment

Figure 19:
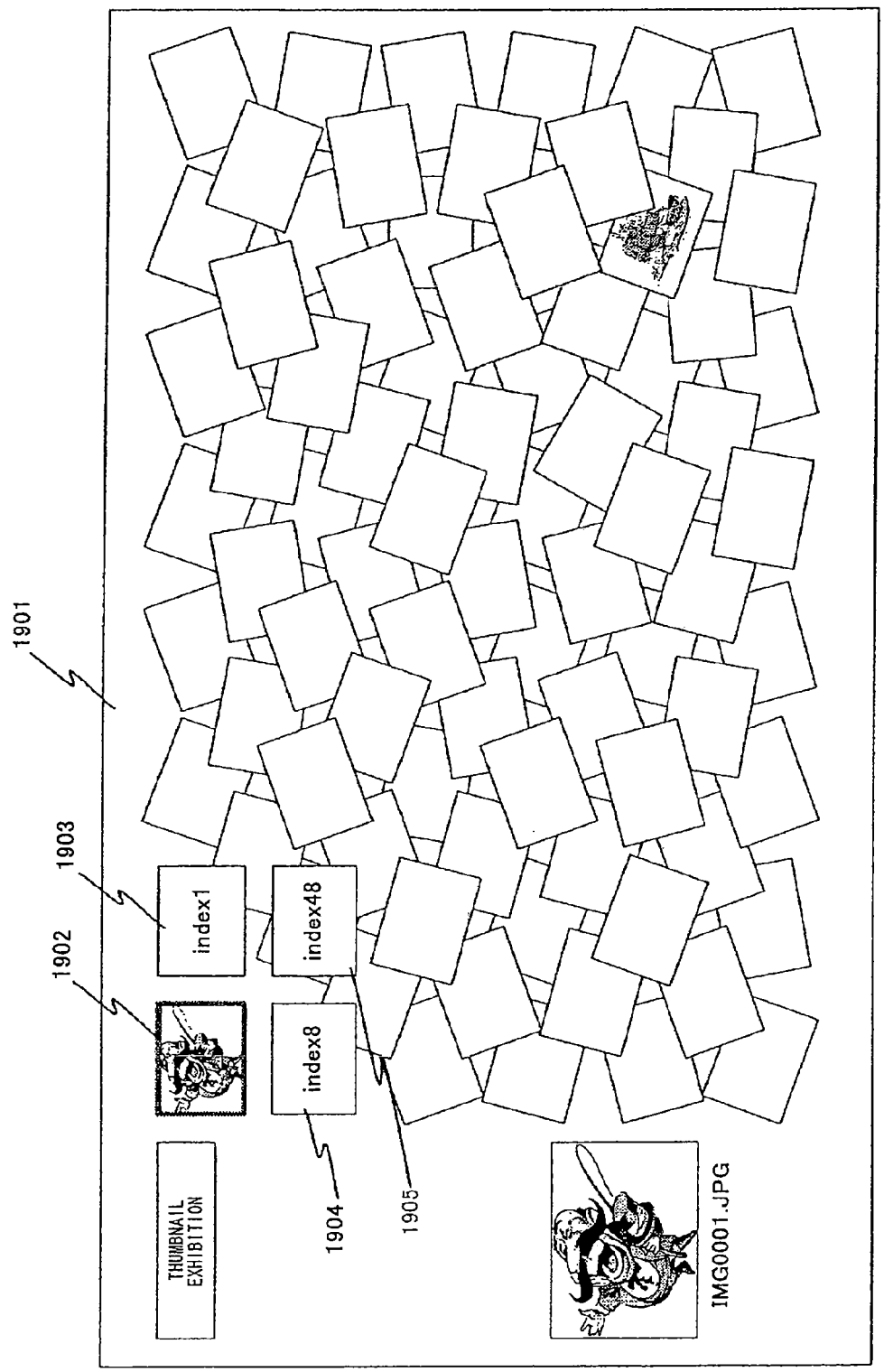
FIG. 19 is an illustration of an example of thumbnail exhibition for many images according to the fourth embodiment of the present invention.

Next, a fourth embodiment of the present invention will be described with reference to the drawings. The configuration of an image display device according to the fourth embodiment, which the present invention is to be applied to, is the same as the configuration of the image display device according to the first, second and third embodiments shown in FIG. 1. FIG. 19 shows thumbnail exhibition according to the fourth embodiment.

The fourth embodiment is configured as shown in FIG. 19. Specifically, a thumbnail image focused by a focus frame indicated by numeral 1902, and images indicated by numerals 1903, 1904, and 1905, which are arranged around the focused image, are rotated so that four sides, that is, top, bottom, right, and left sides, of the focused image and the images 1903 to 1905 are parallel to those of a full display screen 1901, respectively. Thus, the focused image and the images 1903 to 1905 are displayed so that the images are restored to their original positions and thus oriented in accordance with the reference directions. Moreover, the focused image and the images 1903 to 1905 are again rendered so that the images are moved and thus superimposed at the topmost position on overlapping thumbnail images. With this configuration, the press of the cursor keys (that is, operating means) 301 of the remote control shown in FIG. 6 allows determining a direction in which the focus frame 1902 can be moved. In the thumbnail exhibition shown in FIG. 19, the image focused by the focus frame 1902 corresponds to the image having the index value 0 shown in FIG. 11, the image 1903 corresponds to the image having the index value 8 shown in FIG. 11, and the image 1904 corresponds to the image having the index value 48 shown in FIG. 11.

Figure 20:
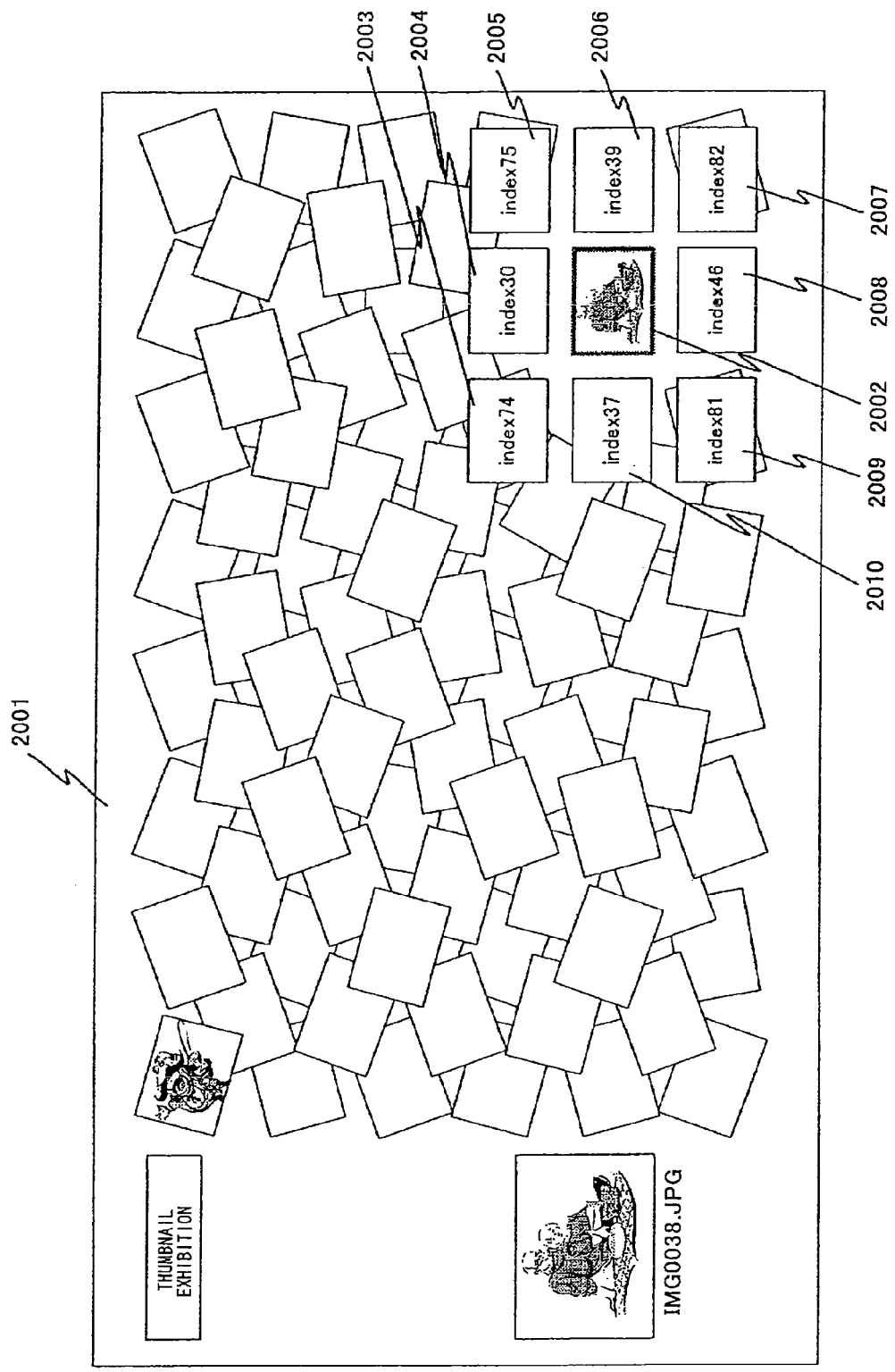
FIG. 20 is an illustration of an example of thumbnail exhibition for many images according to the fourth embodiment of the present invention.

As shown in FIG. 20, the maximum number of images that are again rendered around a thumbnail image focused by a cursor frame 2002 is set to 8. In thumbnail exhibition shown in FIG. 20, an image 2003 corresponds to the image having the index value 74 shown in FIG. 11, an image 2004 corresponds to the image having the index value 30 shown in FIG. 11, an image 2005 corresponds to the image having the index value 75 shown in FIG. 11, an image 2006 corresponds to the image having the index value 39 shown in FIG. 11, an image 2007 corresponds to the image having the index value 82 shown in FIG. 11, an image 2008 corresponds to the image having the index value 46 shown in FIG. 11, an image 2009 corresponds to the image having the index value 81 shown in FIG. 11, and an image 2010 corresponds to the image having the index value 37 shown in FIG. 11.

The above-described display method allows a user to move the focus frame and select any thumbnail image without having difficulty in operating the cursor keys 301 of the remote control shown in FIG. 6. Therefore, the method of the fourth embodiment can achieve a further improvement in ease of operation.

Fifth Embodiment

Next, a fifth embodiment of the present invention will be described with reference to the drawings. The configuration of an image display device according to the fifth embodiment, which the present invention is to be applied to, is the same as the configuration of the image display device according to the first, second, third and fourth embodiments shown in FIG. 1.

Figure 21:
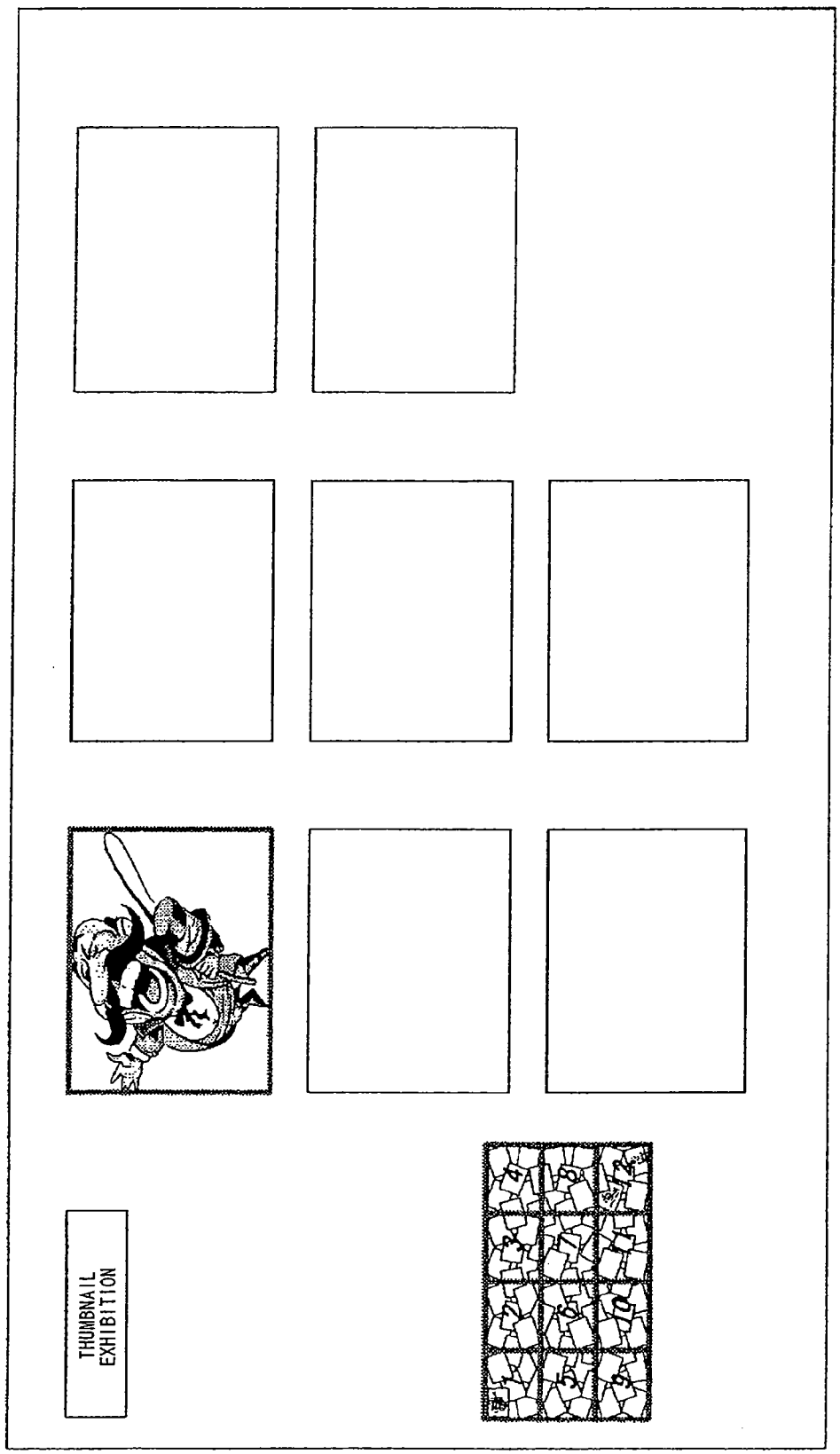
FIG. 21 is an illustration of an example of thumbnail exhibition for many images according to the fifth embodiment of the present invention.

FIG. 21 shows a screen, which appears in situations where, when the thumbnail exhibition shown in FIG. 13 is displayed, a user presses the channel key "1" of the channel keys (that is, area selecting means) 303 of the remote control shown in FIG. 6. The screen shown in FIG. 21 displays, in enlarged view, exhibition of only thumbnail images belonging to the display frame "1" of the display frames indicated by numeral 1301 in FIG. 13.

This display method allows the user to move the focus frame and select any thumbnail image without having difficulty in operating the cursor keys (that is, operating means) 301 of the remote control shown in FIG. 6. Therefore, the method of the fifth embodiment can improve ease of operation. Incidentally, the screen displays, in reduced view, the thumbnail image exhibition shown in FIG. 13 on the left side thereof, and the screen also displays a button which gives an instruction to select the display of the thumbnail exhibition shown in FIG. 13.

Sixth Embodiment

Figure 22:
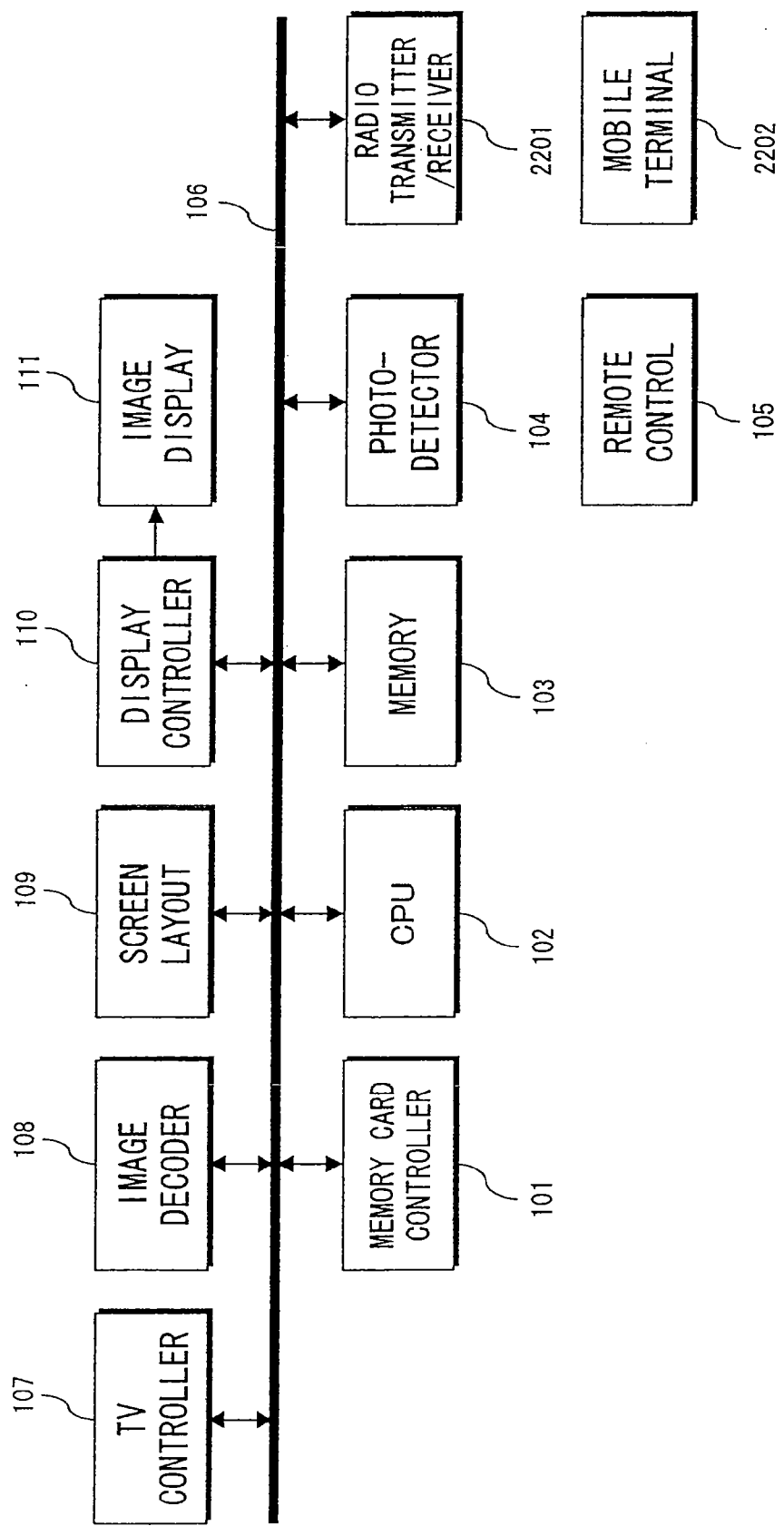
Figure 23:
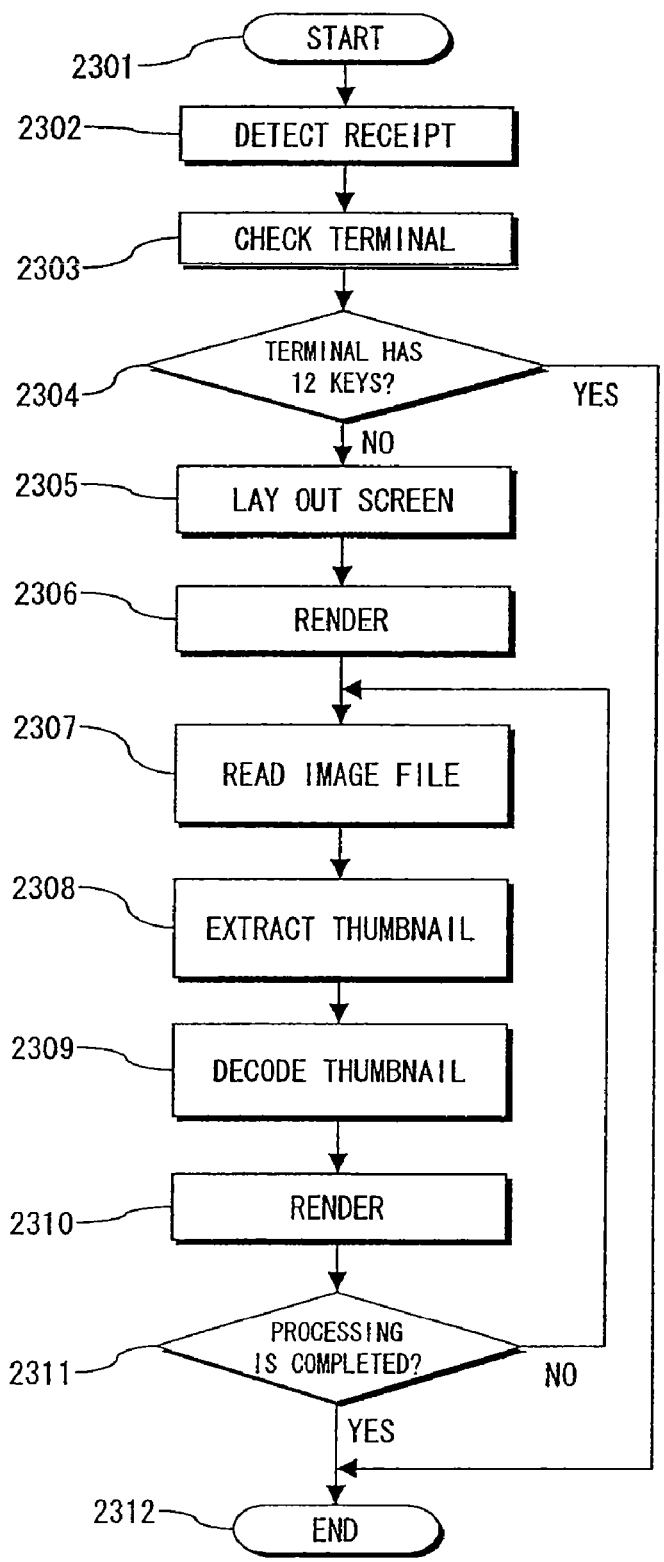
FIG. 23 is a flowchart of operation according to the sixth embodiment of the present invention.

Next, a sixth embodiment of the present invention will be described with reference to the drawings. FIG. 22 shows the configuration of an image display device according to the sixth embodiment of the present invention. In FIG. 22, parts having the same reference numerals as the parts shown in FIG. 1 have the same functions. Referring to FIG. 22, numeral 2201 denotes a radio transmitter/receiver, and numeral 2202 denotes a mobile terminal. FIG. 23 shows the flow of operation, which takes place when a user operates the mobile terminal 2202 shown in FIG. 22 so as to display thumbnail image exhibition shown in FIG. 24. FIG. 25 shows an example of the mobile terminal 2202 shown in FIG. 22. In the sixth embodiment, a mobile telephone is used as the mobile terminal 2202.

Figure 24:
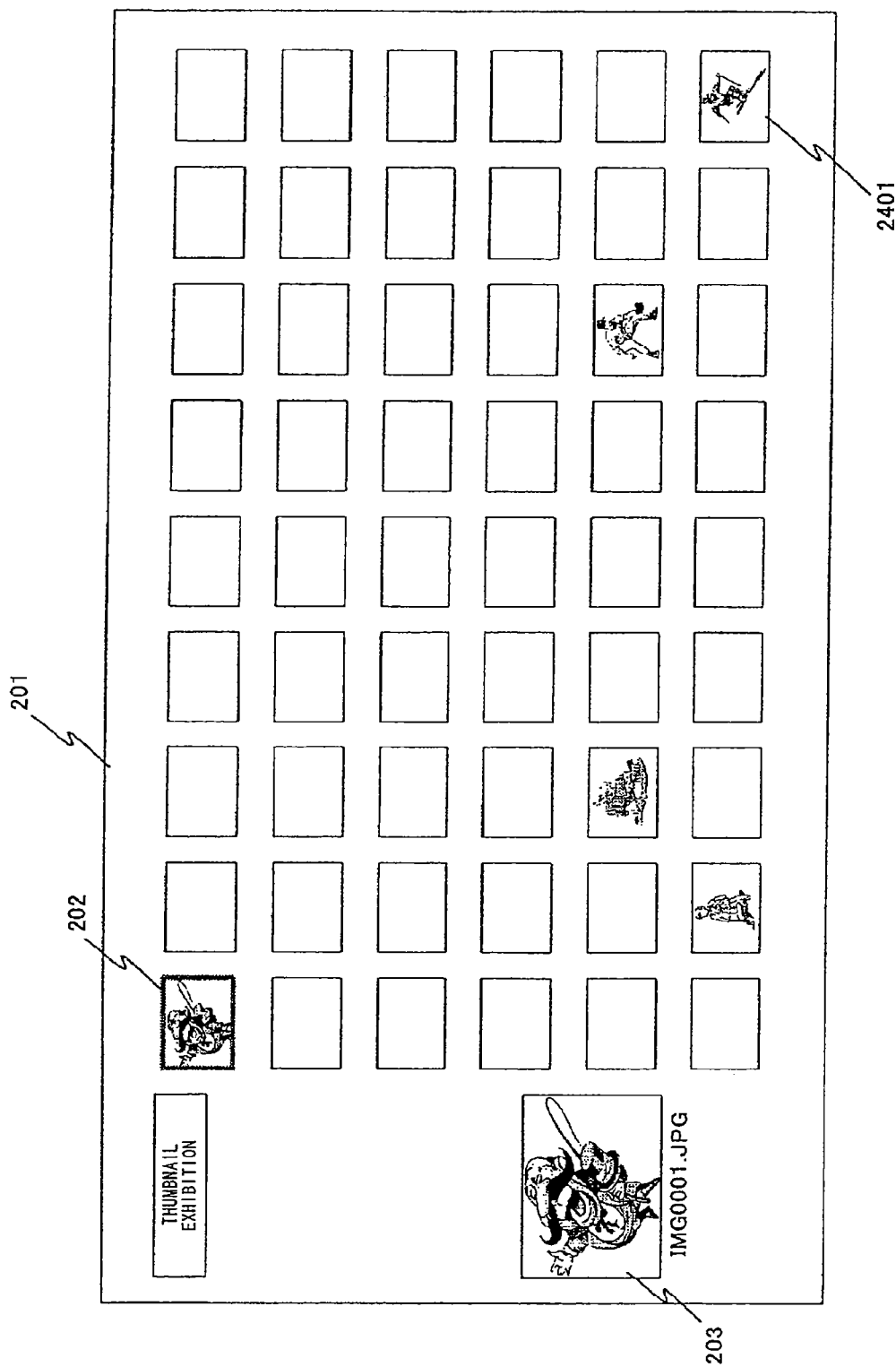
FIG. 24 is an illustration of an example of thumbnail exhibition for many images according to the sixth embodiment of the present invention.
Figure 25:
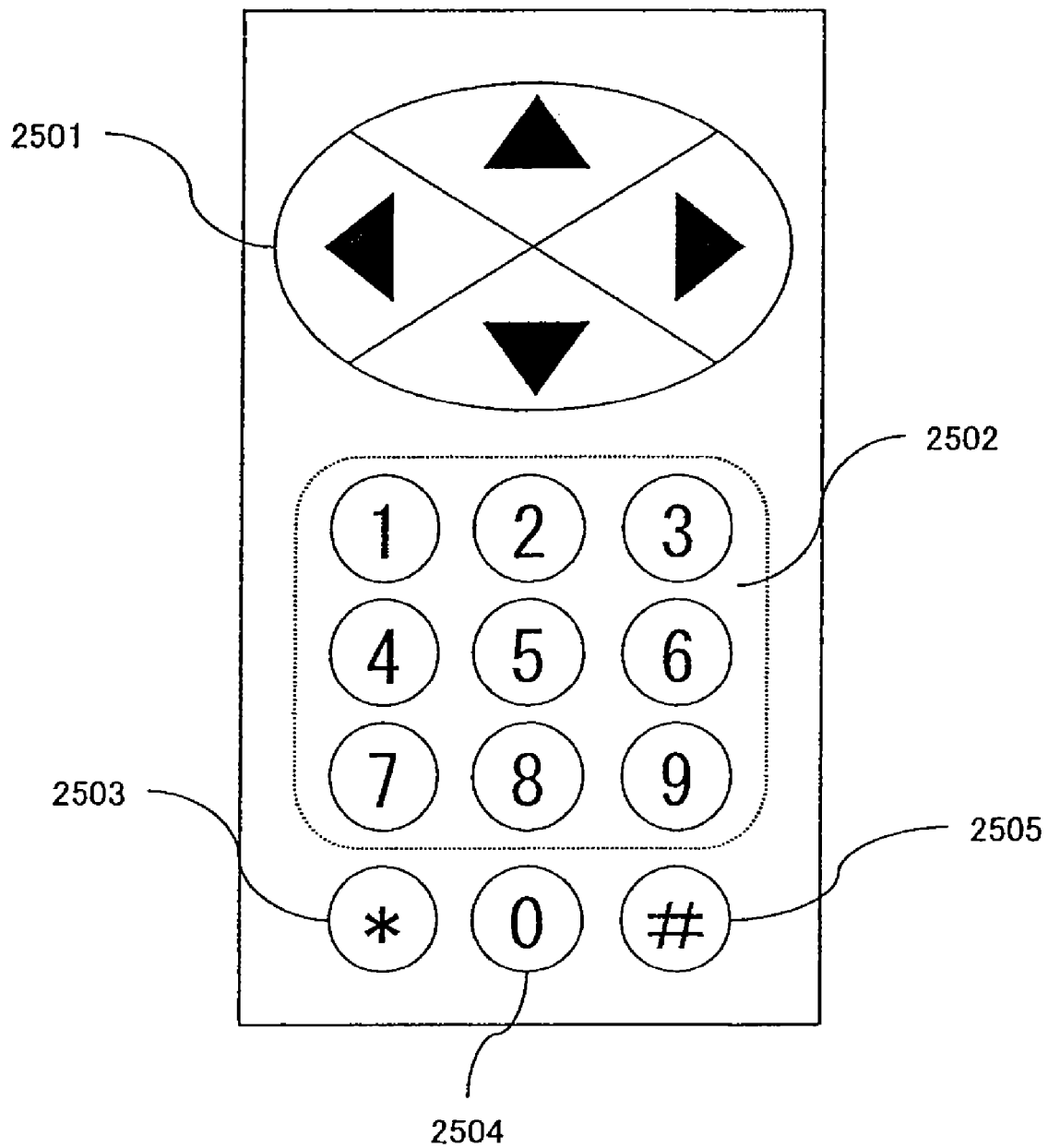
FIG. 25 is an illustration of a mobile terminal according to the sixth embodiment of the present invention.

Referring to FIG. 25, numeral 2501 denotes a set of four cursor keys (that is, operating means) which permit four-directional movements, that is, up, down, right, and left movements, of the focus frame 202 shown in FIG. 24. Numeral 2502 denotes a set of numeric keys "1" to "9" (that is, area selecting means), numeral 2503 denotes a splat key "*", numeral 2504 denotes a numeric key "0", and numeral 2505 denotes a splat key "#".

In step 2301 of FIG. 23, when the user presses the splat key "*" 2503 shown in FIG. 25, the mobile terminal 2202 sends a request signal for thumbnail exhibition to the radio transmitter/receiver 2201 shown in FIG. 22.

In step 2302 of FIG. 23, when the radio transmitter/receiver 2201 detects the receipt of the signal from the mobile terminal 2202 shown in FIG. 22, the radio transmitter/receiver 2201 transmits to the CPU 102 information indicating the detection of receipt.

In step 2303 of FIG. 23, upon receipt of the information indicating the detection of receipt, the CPU 102 shown in FIG. 22 checks how many numeric keys the mobile terminal 2202 has, via the control bus 106 and the radio transmitter/receiver 2201.

In step 2304 of FIG. 23, the CPU 102 determines whether or not the mobile terminal 2202 has 12 numeric keys "1" to "12". When the mobile terminal 2202 does not have 12 numeric keys (No in step 2304), the processing goes to step 2305. When the mobile terminal 2202 has 12 numeric keys (Yes in step 2304), the processing jumps to step 2312, where the processing ends.

In step 2305 of FIG. 23, under control of the CPU 102, display data required for thumbnail image exhibition (except for thumbnail image data), such as background data to be displayed on the full display screen 201 shown in FIG. 24, is transferred via the control bus 106 to the screen layout 109, which then lays out a screen using the display data.

In step 2306 of FIG. 23, the display data is transferred to the display controller 110, which then causes the image display 111 to render and display the display data.

In step 2307 of FIG. 23, under control of the CPU 102 shown in FIG. 22, one of image files stored in a memory card (not shown) is read into the memory 103 via the control bus 106 and the memory card controller 101.

In step 2308 of FIG. 23, under control of the CPU 102 shown in FIG. 22, thumbnail image information is extracted from the image file read into the memory 103.

In step 2309 of FIG. 23, under control of the CPU 102 shown in FIG. 22, the extracted thumbnail image information is supplied to the image decoder 108, which then decodes the thumbnail image.

In step 2310 of FIG. 23, the thumbnail image data decoded in the preceding step is supplied to the display controller 110 shown in FIG. 22, which then causes the image display 111 to render and display the thumbnail image data.

The above-mentioned steps 2307 to 2310 of FIG. 23 are repeatedly executed times equivalent to the number of images that can be simultaneously displayed on one screen. Thus, thumbnail images are rendered in sequence. Rendering of thumbnail images ends in the following manner: at the completion of thumbnail exhibition of a predetermined number of thumbnail images, the processing goes to step 2312, where the processing ends. In the sixth embodiment, the predetermined number of images is set to 54. When the number of image files stored in the memory card is less than 54, the processing goes to and ends in step 2312 at the completion of thumbnail exhibition of all images stored in the memory card.

Next, the description is given with reference to the drawings with regard to operation, which a user performs so as to select an image indicated by numeral 2401 from the thumbnail exhibition shown in FIG. 24 and display the image 2401 on the full screen 201.

Figure 26:
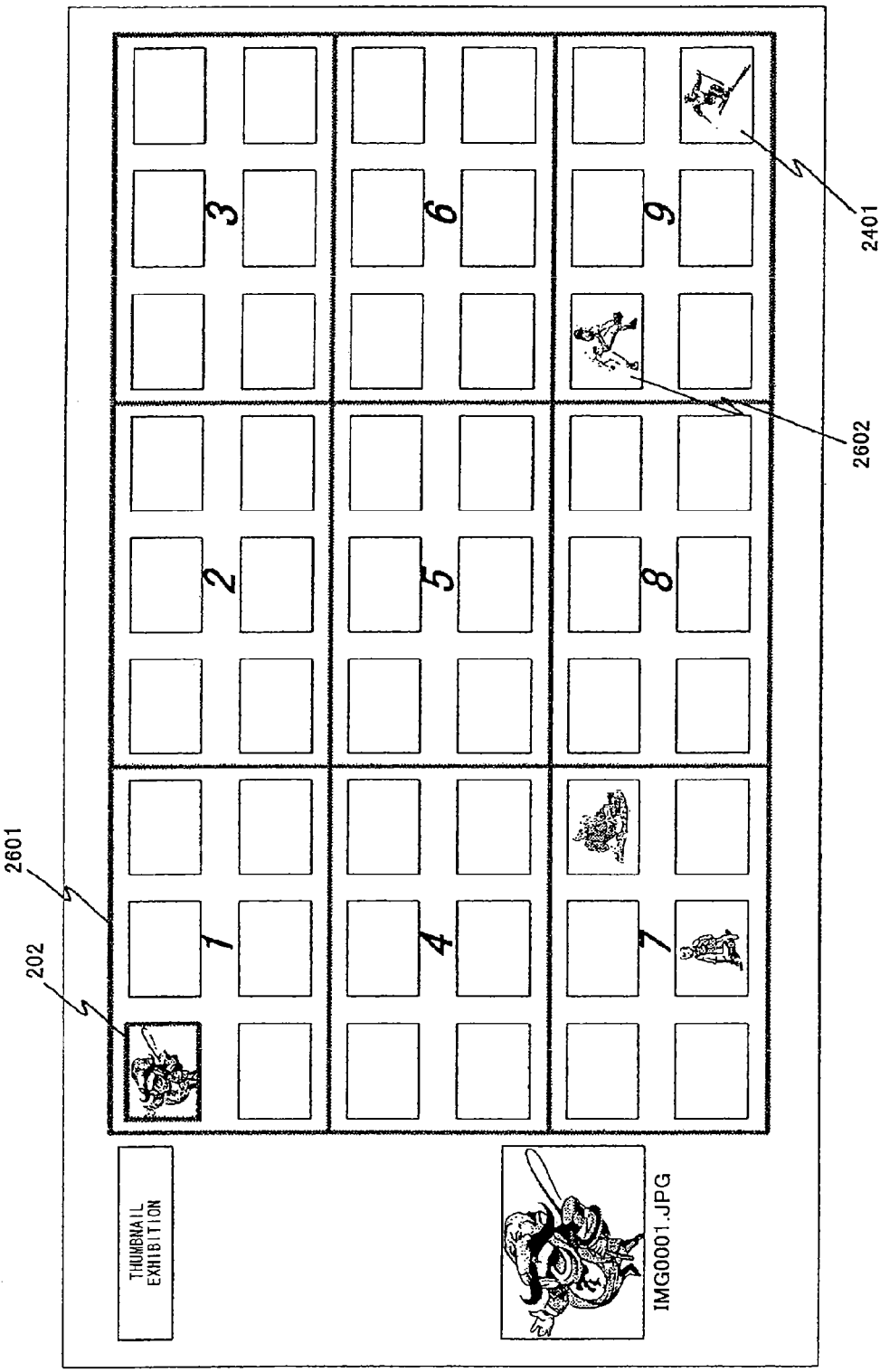
FIG. 26 is an illustration of an example of thumbnail exhibition for many images according to the sixth embodiment of the present invention.

When the thumbnail exhibition shown in FIG. 24 is displayed, the user presses the splat key "#" 2505 shown in FIG. 25. Thus, a screen shown in FIG. 26 appears. In FIG. 26, numeral 2601 indicates display frames, each of which selects a thumbnail image display area. The number of thumbnail image display areas corresponds to the number of numeric keys 2502 shown in FIG. 25. In the sixth embodiment, the number of numeric keys is set to 9. To select the image indicated by numeral 2401 in FIG. 26 (which is the same as numeral 2401 in FIG. 24), the user first presses the numeric key "9" of the numeric keys indicated by numeral 2502 in FIG. 25. By this operation, the focus frame indicated by numeral 202 in FIG. 26 (which is the same as numeral 202 in FIG. 24) is moved to the position of an image indicated by numeral 2602. Then, the user uses the cursor keys 2501 shown in FIG. 25 so as to move the focus frame 202 to the position of the image indicated by numeral 2401. Then, the user presses the numeric key "0" 2504 shown in FIG. 25 so as to display the image on the full screen.

As described above, even when the mobile terminal, such as the mobile telephone having less than 12 numeric keys, is used for operation, the method of the sixth embodiment brings the number of thumbnail image display areas into correspondence with the number of numeric keys of the mobile terminal, and thus enables about the same number of operations as the method of the first embodiment enables. Therefore, the method of the sixth embodiment can reduce the number of operations and thus improve ease of operation, as compared to the prior art.

Seventh Embodiment

Figure 27:
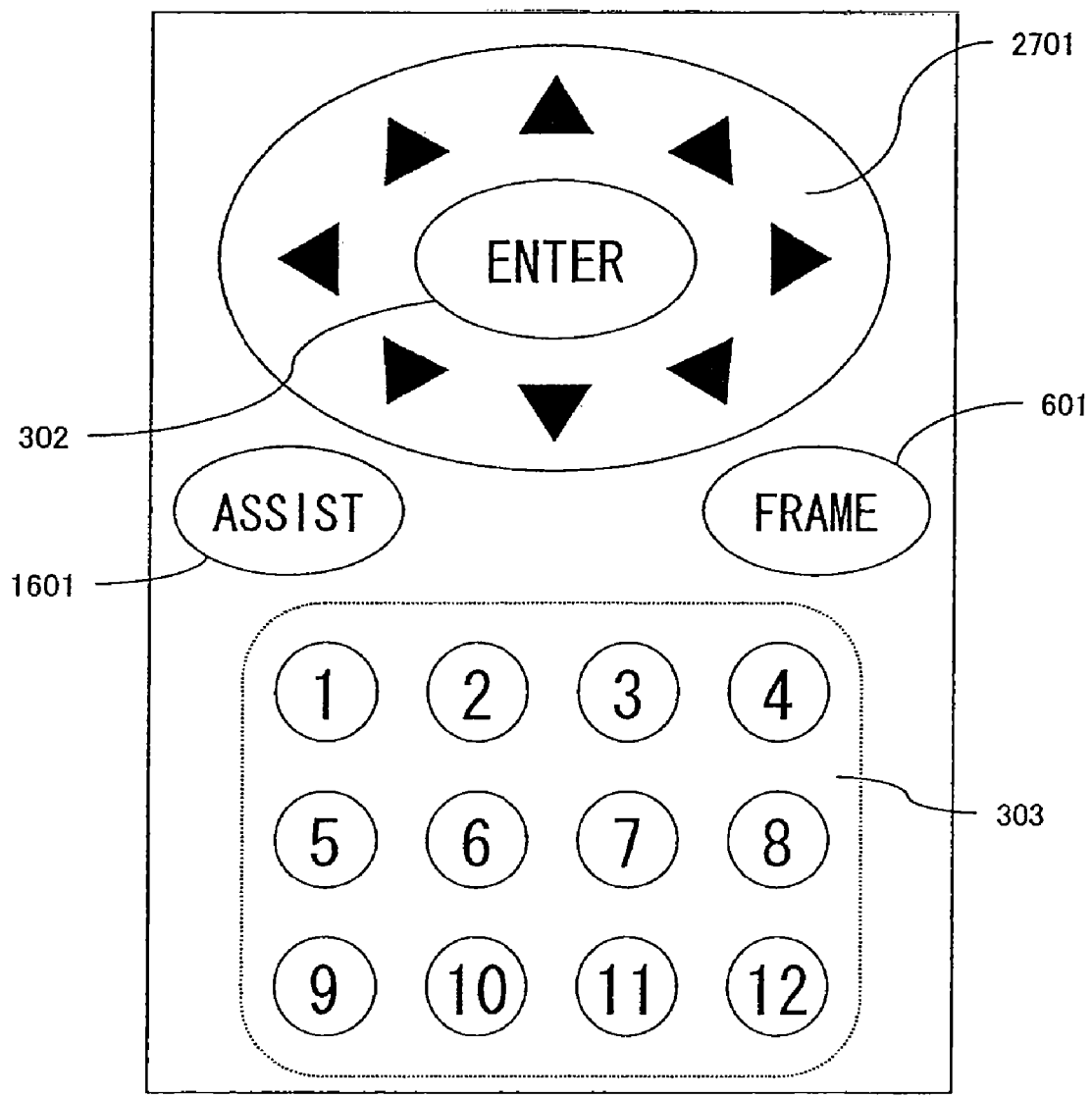
FIG. 27 is an illustration of a remote control according to the seventh embodiment of the present invention.

Next, a seventh embodiment of the present invention will be described with reference to the drawings. The configuration of an image display device according to the seventh embodiment, which the present invention is to be applied to, is the same as the configuration of the image display device according to the first, second, third, fourth and fifth embodiments shown in FIG. 1. FIG. 27 shows a remote control for use in the seventh embodiment. In FIG. 27, parts having the same reference numerals as the parts shown in FIGS. 6 and 16 have the same functions. In FIG. 27, numeral 2701 denotes a set of eight cursor keys (that is, operating means) which permit eight-directional movements.

Figure 28:
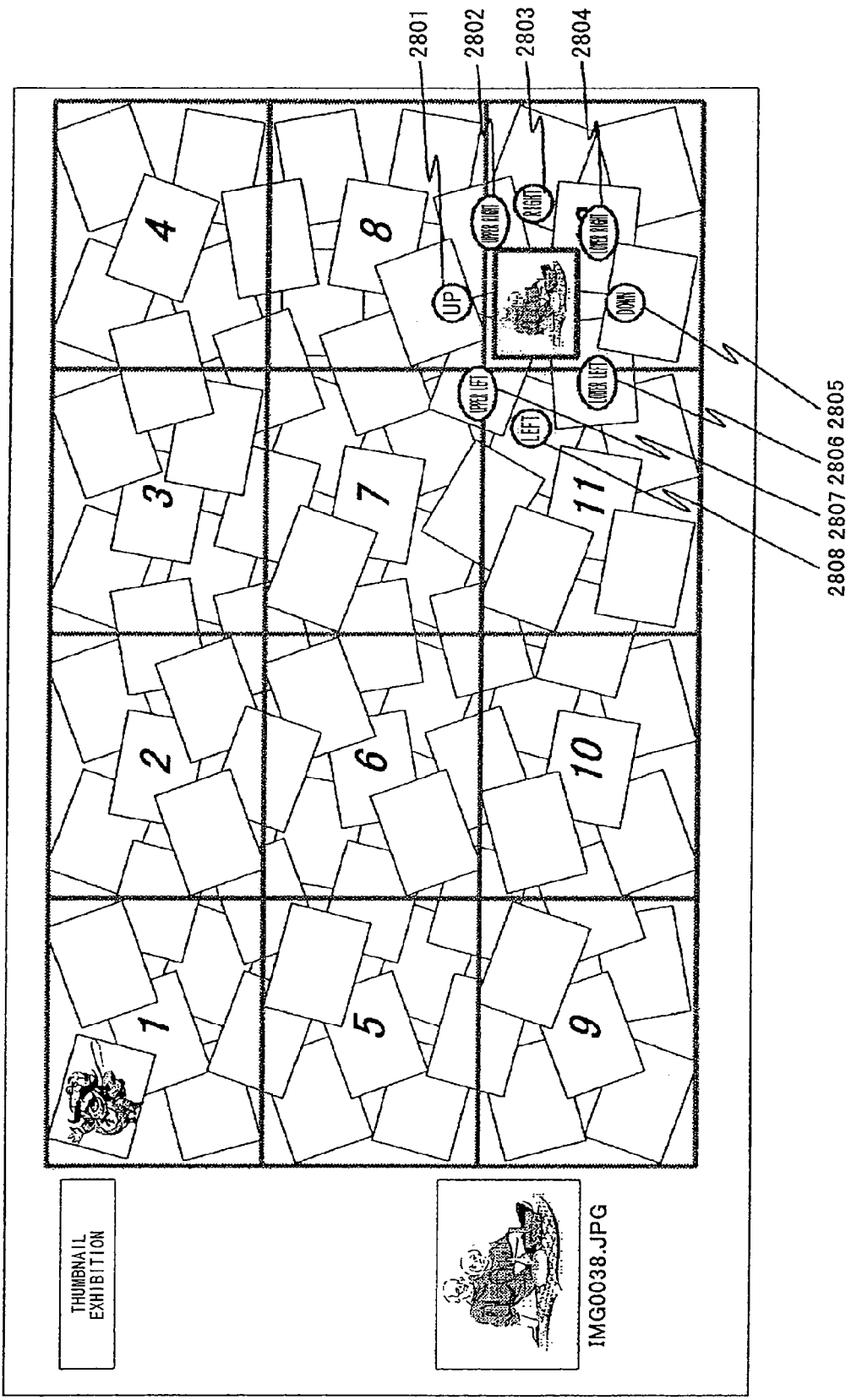
FIG. 28 is an illustration of an example of thumbnail exhibition for many images according to the seventh embodiment of the present invention.

When the remote control shown in FIG. 27 is used, 8 assist display images, as discussed in the description of the third embodiment, are displayed to indicate "up", "upper right", "right", "lower right", "down", "lower left", "left", and "upper left", as designated by numerals 2801 to 2808 in FIG. 28. As mentioned above, the number of assist display images corresponds to the number of cursor keys of the remote control. This allows a user to move the focus frame and select any thumbnail image without having difficulty in operating the remote control. Therefore, the method of the seventh embodiment can improve ease of operation. In the above-described embodiments, the auxiliary image may disappear through the undoing of the pressed key. Similarly, the image oriented in the reference directions may be again rotated by the angle θ and displayed in its rotated position through the undoing of the pressed key.

As described above, the method of the present invention can improve ease of operation with which a user selects an image when many images are simultaneously displayed on a screen.

What is claimed is:

1. An image display method for selecting one image from among a plurality of images displayed on an image display screen by using an operation device having numeric keys and cursor keys, the image display method comprising the steps of:

displaying a plurality of images overlapped with each other on the image display screen, in such a manner that each of the plurality of images is rotated in a plane parallel to the image display screen by a random angle θ (0°<θ<360°) with respect to a reference direction in the image display screen;

checking how many numeric keys the operation device has;

dividing a display area containing the plurality of images displayed on the image display screen into a plurality of divided areas, in such a manner that a number of the divided areas is the same as the number of the numeric keys of the operation device, and each of the divided areas contains some images;

assigning the numeric keys of the operation device to the plurality of divided areas, respectively;

allowing a user to select any divided area from among the plurality of divided areas through an operation of the numeric key corresponding to the divided area, and thereby limit a range of candidate images for selection, the candidate images being contained in the selected divided area;

enlarging the candidate images contained in the selected divided area and displaying the enlarged candidate images arranged on the image display screen, without dividing the selected divided area into a plurality of divided areas in such a manner that a number of the divided areas is the same as the number of the numeric keys of the operation device;

wherein, in a case of enlarging the candidate images contained in the selected divided area and displaying the enlarged candidate images arranged on the image display screen, the plurality of images rotated and overlapped with each other are displayed in reduced size on the image display screen; and allowing the user to select any image from among the candidate images through an operation of the cursor keys.

2. An image display apparatus comprising:

an operation device having numeric keys and cursor keys, which device is used for selecting one image from among a plurality of images displayed on an image display screen;

a displaying portion which displays a plurality of images overlapped with each other on the image display screen, in such a manner that each of the plurality of images is rotated in a plane parallel to the image display screen by a random angle $\theta$ ($0°<\theta<360°$) with respect to a reference direction in the image display screen;

a checking portion which checks how many numeric keys the operation device has;

a dividing portion which divides a display area containing the plurality of images displayed on the image display screen into a plurality of divided areas, in such a manner that a number of the divided areas is the same as the number of the numeric keys of the operation device, and each of the divided areas contains some images;

an assigning portion which assigns the numeric keys of the operation device to the plurality of divided areas, respectively;

an area selecting portion which allows a user to select any divided area from among the plurality of divided areas through an operation of the numeric key corresponding to the divided area, and thereby limit a range of candidate images for selection, the candidate images being contained in the selected divided area;

an enlarging portion which enlarges the candidate images contained in the selected divided area and displays the enlarged candidate images arranged on the image display screen, without dividing the selected divided area into a plurality of divided areas in such a manner that a number of the divided areas is the same as the number of the numeric keys of the operation device;

wherein, in a case of enlarging the candidate images contained in the selected divided area and displaying the enlarged candidate images arranged on the image display screen, the plurality of images rotated and overlapped with each other are displayed in reduced size on the image display screen; and an image selecting portion which allows the user to select any image from among the candidate images through an operation of the cursor keys.

* * * * *